US008800709B2

(12) United States Patent
Watanabe et al.

(10) Patent No.: US 8,800,709 B2
(45) Date of Patent: Aug. 12, 2014

(54) APPARATUS FOR DETERMINING VEHICLE ROLLOVER RISK

(75) Inventors: Asahi Watanabe, Fujisawa (JP); Hiroshi Furuyama, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 105 days.

(21) Appl. No.: 13/241,655

(22) Filed: Sep. 23, 2011

(65) Prior Publication Data

US 2012/0130612 A1 May 24, 2012

(30) Foreign Application Priority Data

Nov. 24, 2010 (JP) ................................. 2010-261572

(51) Int. Cl.
*B60R 21/0132* (2006.01)
*B60T 8/1755* (2006.01)
*B60W 30/04* (2006.01)
*B60R 21/01* (2006.01)
*B60R 21/013* (2006.01)

(52) U.S. Cl.
CPC ......... *B60R 21/0132* (2013.01); *B60T 8/17551* (2013.01); *B60T 8/17554* (2013.01); *B60W 30/04* (2013.01); *B60R 2021/01259* (2013.01); *B60R 2021/01306* (2013.01); *B60R 2021/01327* (2013.01); *B60T 2230/03* (2013.01); *B60W 2030/041* (2013.01); *B60W 2030/043* (2013.01)
USPC ........................................... 180/282; 701/70

(58) Field of Classification Search
CPC ............ B60T 8/17554; B60T 2230/03; B60T 2240/06; B60T 8/17551; B60W 30/04; B60W 2030/041; B60W 2030/043
See application file for complete search history.

(56) References Cited

U.S. PATENT DOCUMENTS 6,055,472 A * 4/2000 Breunig et al. ................. 701/45
(Continued)

FOREIGN PATENT DOCUMENTS

JP 2000-510407 8/2000
JP 2004-534694 11/2004
(Continued)

OTHER PUBLICATIONS

Chen et al. "Vehicle Rollover Avoidance", IEEE Control Systems Magazine, Aug. 2010, pp. 70-85.*

(Continued)

*Primary Examiner* — John R Olszewski
*Assistant Examiner* — Todd Melton
(74) *Attorney, Agent, or Firm* — Antonelli, Terry, Stout & Kraus, LLP.

(57) ABSTRACT

A control apparatus for a vehicle, comprising a control unit having: a resultant acceleration information calculating section (100c) configured to calculate a resultant acceleration which is a synthesis of two direction accelerations acted upon the vehicle; a resultant jerk calculating section (100c2) configured to calculate a resultant jerk of at least one of change rates of the two directional accelerations with respect to time and a change rate of the resultant acceleration with respect to time; and a rollover tendency determining section (100e) configured to determine a tendency of rollover of the vehicle using at least one of the calculated resultant acceleration and the calculated resultant jerk.

19 Claims, 10 Drawing Sheets

(56) References Cited

U.S. PATENT DOCUMENTS

| | | | |
|---|---|---|---|
| 6,064,931 A | | 5/2000 | Sawada et al. |
| 6,141,604 A | * | 10/2000 | Mattes et al. ............... 701/1 |
| 6,498,976 B1 | * | 12/2002 | Ehlbeck et al. ............ 701/70 |
| 6,560,519 B2 | * | 5/2003 | Williams et al. ............ 701/45 |
| 6,593,849 B2 | * | 7/2003 | Chubb et al. ............. 340/446 |
| 6,678,631 B2 | * | 1/2004 | Schiffmann ............... 702/151 |
| 7,149,614 B2 | * | 12/2006 | Traechtler et al. ........... 701/38 |
| 7,162,340 B2 | * | 1/2007 | Schubert et al. ............ 701/38 |
| 7,546,194 B2 | * | 6/2009 | Darvish ..................... 701/45 |
| 7,603,221 B2 | * | 10/2009 | Urvoy et al. ............... 701/93 |
| 2005/0080544 A1 | | 4/2005 | Suzuki et al. |
| 2010/0191423 A1 | * | 7/2010 | Koyama et al. ............ 701/42 |

FOREIGN PATENT DOCUMENTS

| | | |
|---|---|---|
| JP | 2005-112195 | 4/2005 |
| WO | WO 99/28172 | 6/1999 |
| WO | WO 03/008242 A1 | 1/2003 |

OTHER PUBLICATIONS

Masato Abe, Vehicle Dynamics and Control, Sankaidou 1992, pp. 152.

JP Office Action for Japanese Patent Application No. 2010-261572, issued on Jan. 16, 2013.

* cited by examiner

APPARATUS FOR DETERMINING VEHICLE ROLLOVER RISK

BACKGROUND OF THE INVENTION (1) Field of the Invention

The present invention relates to a control apparatus for a vehicle and, particularly, relates to an apparatus for determining a tendency of rollover of the vehicle.

(2) Description of Related Art

A Japanese PCT Application Publication (tokuhyou) No. 2004-534694 published on Nov. 18, 2004 (which corresponds to WO 03/008242 A1 published on Jan. 30, 2003 and corresponds to a U.S. Pat. No. 7,149,614 issued on Dec. 12, 2006) exemplifies a previously proposed vehicular control apparatus which determines the tendency of rollover of the vehicle. In the disclosed control apparatus of the above-described Japanese PCT Application Publication No. 2004-534694, a variable representing a lateral dynamic characteristic of the vehicle is prepared using a lateral acceleration of the vehicle and the tendency of rollover of the vehicle is determined depending upon whether the value of the variable is equal to or larger than a threshold value.

SUMMARY OF THE INVENTION

However, there is room of an improvement in a determination accuracy of the tendency of rollover of the vehicle in the above-described previously proposed control apparatus.

It is, therefore, an object of the present invention to provide a control apparatus for a vehicle which is capable of improving the determination accuracy of the tendency of rollover of the vehicle.

In order to achieve the above-described object, the apparatus according to the present invention, particularly, the tendency of rollover of the vehicle is determined using a resultant acceleration which is a synthesis of accelerations in a plurality of directions of the vehicle acted upon the vehicle.

According to one aspect of the present invention, there is provided a control apparatus for a vehicle, comprising a control unit including: a resultant acceleration information calculating section configured to calculate a resultant acceleration which is a synthesis of two direction accelerations acted upon the vehicle; a resultant jerk calculating section configured to calculate a resultant jerk of at least one of change rates of the two direction accelerations with respect to time and a change rate of the resultant acceleration with respect to time; and a rollover tendency determining section configured to determine a tendency of rollover of the vehicle using at least one of the calculated resultant acceleration and the calculated resultant jerk.

According to another aspect of the present invention, there is provided a control apparatus for a vehicle, comprising: a longitudinal acceleration calculating section configured to calculate a longitudinal acceleration acted upon the vehicle; a lateral acceleration calculating section configured to calculate a lateral acceleration acted upon the vehicle; a resultant acceleration information calculating section configured to calculate a resultant acceleration information related to a resultant acceleration which is a synthesis of the calculated respective accelerations; a rollover tendency determining section configured to determine the tendency of rollover of the vehicle on a basis of a magnitude of the calculated resultant acceleration information; and a control unit configured to actuate a brake actuator to provide a braking force for at least one or each of road wheels installed on the vehicle when the rollover tendency determining section determines the tendency of rollover of the vehicle.

According to still another aspect of the present invention, there is provided a control apparatus for a vehicle, comprising: a longitudinal acceleration sensor configured to detect a longitudinal acceleration acted upon the vehicle; a lateral acceleration sensor configured to detect a lateral acceleration acted upon the vehicle; a resultant acceleration calculating section configured to detect a resultant acceleration on a basis of the detected longitudinal acceleration and lateral acceleration; a resultant jerk calculating section configured to calculate a change rate of the calculated resultant acceleration with respect to time; and a control unit configured to calculate a motion of the vehicle on a basis of the calculated resultant acceleration and the resultant jerk and configured to determine a tendency of rollover of the vehicle when the calculated motion of the vehicle is larger than a predetermined motion.

DETAILED DESCRIPTION OF THE INVENTION

Reference will, hereinafter, be made to the drawings in order to facilitate a better understanding of the present invention.

(First Embodiment)

[Structure of First Embodiment]

Figure 1A:
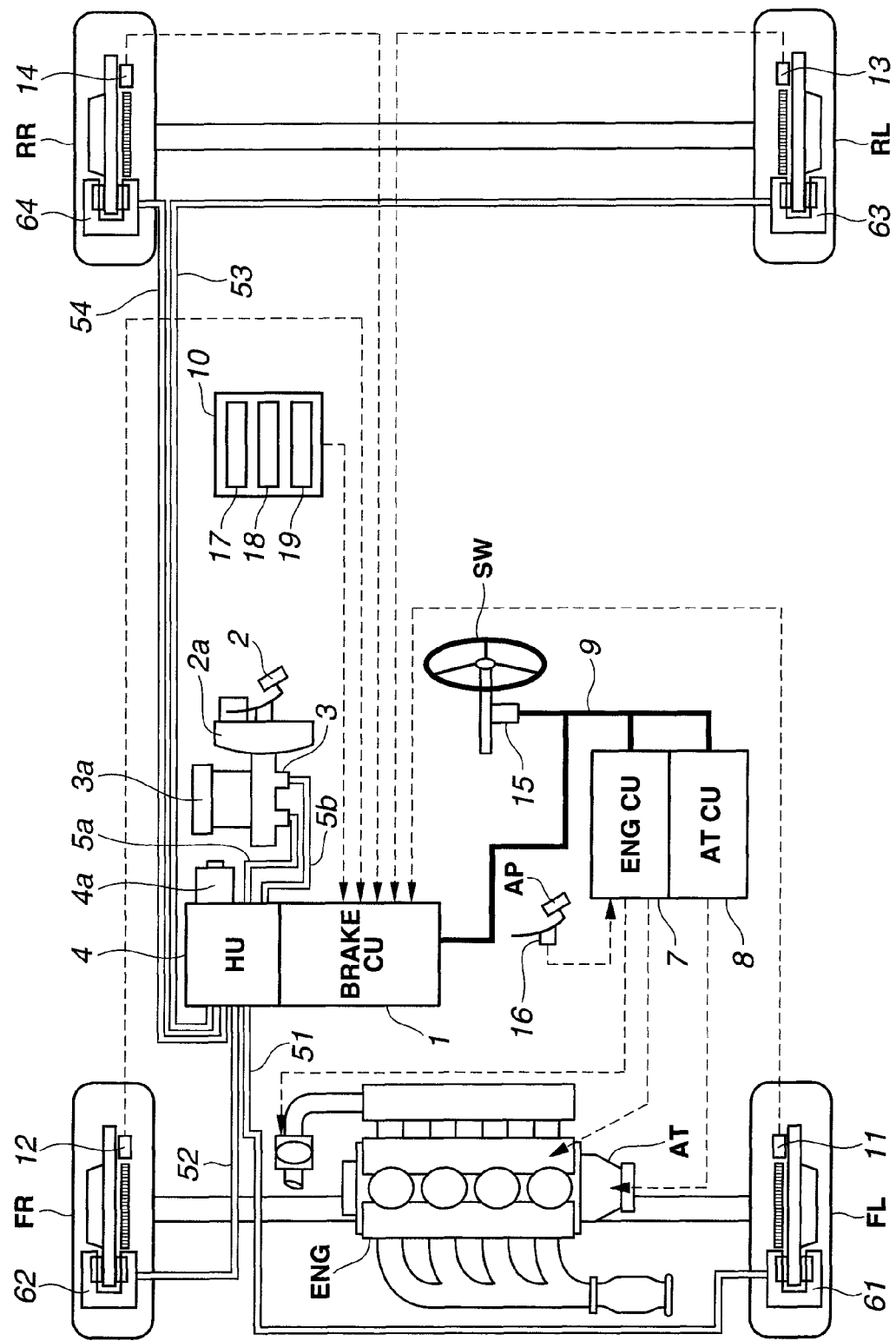
FIG. 1A is a system configuration view of a vehicle in which a control apparatus in a first preferred embodiment according to the present invention is applicable.

A control apparatus for a vehicle in a first preferred embodiment is applicable to an automotive vehicle. FIG. 1A is a rough configuration view of a vehicular system on which the control apparatus is mounted. The vehicle is provided with a plurality of road wheels, specifically, four road wheels of front left road wheel FL, front right road wheel FR, a rear right road wheel RR, and a rear left road wheel RL. An output of an internal combustion engine (engine ENG) is transmitted to front road wheels FL, FR which are driving wheels as a driving force with a gear shift carried out through an automatic transmission AT. The driving system is provided with an accelerator opening angle sensor 16 which detects a depression quantity (of an accelerator pedal AP), namely, (a demanded driving force of a driver) and is provided with an engine control unit 7 and an AT (Automatic Transmission) control unit 8 which receive the information inputted from accelerator opening angle sensor 16 and a CAN (Controller Area Network) communication line (a CAN bus 9), outputs a command signal to engine ENG and automatic transmission AT to control the driving force of front road wheels FL, FR.

A brake system includes: a brake control unit (Brake CU) 1, a brake pedal 2; a master cylinder 3; a liquid pressure unit (HU) 4; wheel cylinders 61, 62, 63, 64; and various kinds of sensors. Brake pedal 2 is an operational member through which a driving operation by a vehicle driver is inputted and is connected to master cylinder 3 via a booster 2a which is a servo unit (or a boosting unit). Master cylinder 3 is, so-called, a tandem type and is connected to liquid pressure unit (HU) 4 via two-system brake pipings 5a, 5b. Liquid pressure unit 4 is a hydraulic pressure unit having a hydraulic pressure circuit. Wheel cylinders 61 through 64 are connected to liquid pressure unit 4 via brake pipings 51 through 54 such that brake pressures (wheel cylinder pressure) can be generated on respective road wheels FL, FR, RL, RR. A brake circuit thereof is, so-called, an X piping structure in which wheel cylinders 61, 64 for left front road wheel FL and right rear road wheel RR are connected to a P system brake piping 5a and wheel cylinders 62, 63 for right front road wheel FR and for left front road wheel FL are connected to an S system brake piping 5b, respectively. It should be noted that the brake circuit may be, so-called, a longitudinal piping structure. Master cylinder 3 generates a liquid pressure (a master cylinder pressure) in accordance with a depression quantity (a manipulated variable) of brake pedal 2 upon receipt of the supply of a brake liquid from a reservoir tank 3a integrally installed on master cylinder 3. The master cylinder pressure is supplied to each wheel cylinder 61 through 64 via liquid pressure unit (HU) 4. The liquid pressure of each wheel cylinder generates the driving force for the corresponding one of the road wheels FL, FR, RL, RR. Liquid pressure unit 4 is a brake actuator in which a plurality of electromagnetic valves, an electric motor 4a, and pumps are disposed and wheel cylinder liquid pressures of respective road wheels FL, FR, RL, RR are arbitrarily increased or decreased through the controls of operations of electromagnetic valves so as to have a function such that a desired driving force can be given for each of the plurality of road wheels.

Brake control unit (Brake CU) 1 is an electronic control unit (ECU) which performs a determination of a brake control execution on a basis of the information inputted from various sensors and CAN bus 9 and outputs a command signal to liquid pressure unit 4 to control an actuation of liquid pressure unit 4 to execute the brake control. The brake control has a meaning that a wheel lock is suppressed or a vehicular motion is controlled by controlling the wheel cylinder liquid pressures (braking pressures) of respective road wheels FL, FR, RL, RR in response to requests of functions of securing a safety and convenience such as an anti lock brake control ABS (Anti Lock Brake System) which suppresses an increase in a wheel slip rate of the vehicle and a stability control VDC (Vehicle Dynamics Control) which suppresses a vehicular sideslip. It should be noted that brake control unit 1 may be disposed as an integral unit with liquid pressure unit 4 but may mutually separately be disposed. Brake control unit 1, engine control unit 7, and AT control unit 8 are mutually interconnected with CAN communication line (CAN bus 9) which is bi-directionally communicable and the information is communicable in both directions.

The various kinds of sensors constitute vehicular information detecting means and are provided with a vehicular motion sensor unit 10; road wheel speed sensors 11 through 14; and a steering angle sensor 15. Road wheel speed sensors 11 through 14 are installed on respective road wheels FL, FR, RL, RR for detecting revolution speeds (road wheel speeds) of respectively corresponding road wheels FL, FR, RL, RR and for outputting detection signals thereon to brake control unit 1. Steering angle sensor 15 detects a rotational angle (namely, a steering angle) of a steering wheel (SW) that the driver operates and outputs the detection signal to CAN bus 9. Vehicular motion sensor unit 10 is a composite sensor integrated with sensors 17, 18, 19 which detect various information such as an acceleration G and a yaw rate γ, each representing a vehicular motion, and outputs the detection signals to brake control unit 1. In details, a longitudinal acceleration sensor 17 detects an acceleration in a longitudinal direction acted upon the vehicle, namely, a longitudinal acceleration Xg representing a vehicular pitching motion. Lateral acceleration sensor 18 detects an acceleration in the longitudinal direction acted upon the vehicle, namely, a lateral acceleration Yg representing a roll motion of the vehicle. Yaw rate sensor 19 detects a change speed of the rotational angle in a turning direction of the vehicle, namely, a yaw rate γ representing a yawing motion of the vehicle. Brake control unit 1 adjusts a brake pressure of each of road wheels FL, FR, RL, RR in accordance with the detected vehicular motion and the corresponding road wheel revolution speed. The brake controls such as ABS, VDC, and ACC (Adaptive Cruise Control) are executed. The details of these controls are well known. Hence, the explanation thereon will, herein, be omitted.

Figure 1B:
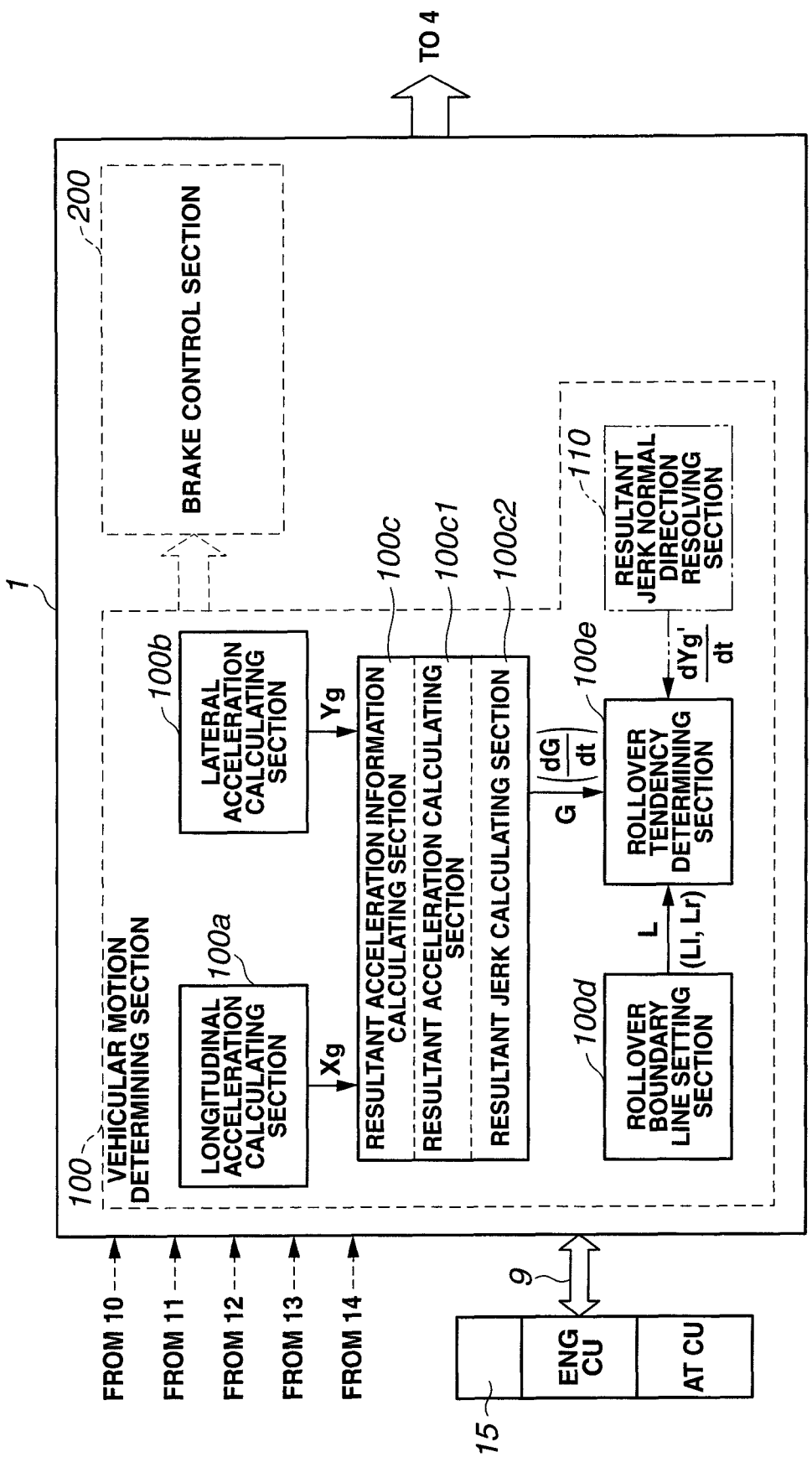
FIG. 1B is a functional block diagram of a brake control unit (brake CU) 1 shown in FIG. 1A.

Brake control unit 1 (hereinafter, also simply referred to as a control unit 1) constitutes the control apparatus for the vehicle. FIG. 1B shows a functional block diagram of control unit 1 shown in FIG. 1A. Control unit 1 in the first embodiment includes a vehicular motion determining section 100 and a brake control section 200. Vehicular motion determining section 100 determines whether the vehicle has a tendency of rollover of the vehicle. It should be noted that, in the present specification, the term of "rollover tendency" represents a probability (a degree of possibility) of an occurrence of the rollover of the vehicle and means not only a presence or absence of the possibility of the rollover occurrence but also its height (high possibility or low possibility). In addition, in a case where vehicular motion determining section 100 determines the tendency of rollover of the vehicle, brake control section 200 actuates liquid pressure unit 4 so that braking forces are given to the plurality of road wheels FL, FR, RL, RR to suppress the rollover tendency (refer to FIG. 4A).

Vehicular motion determining section 100 includes: a longitudinal acceleration calculating section 100a which calculates an acceleration Xg in a longitudinal direction (a forward-and-backward direction of the vehicle) acted upon the vehicle; a lateral acceleration calculating section 100b which calculates another acceleration Yg in a lateral direction (a leftward-and-rightward direction of the vehicle) acted upon the vehicle; a resultant acceleration information calculating section 100c which calculates a resultant acceleration information related to a resultant acceleration G which is a synthesis of respectively calculated accelerations Xg, Yg; a rollover boundary line setting section 100d which presets a rollover boundary line; and a rollover tendency determining section 100e which determines the tendency of rollover of the vehicle using the calculated resultant acceleration information and the rollover boundary line. Longitudinal acceleration and lateral acceleration calculating sections 100a, 100b calculates the longitudinal acceleration Xg and lateral acceleration Yg respectively on a basis of the detection signals from vehicular motion sensor unit 10. It should be noted that it is preferable to execute a filtering calculation for each of the detection signals of the sensors in order to extract acceleration components of the vehicular motion by eliminating external disturbance components of the accelerations due to road surface noises. Resultant acceleration calculating section 100c1 calculates a resultant acceleration G on a basis of longitudinal acceleration Xg and lateral acceleration Yg calculated respectively by longitudinal acceleration calculating section 100a and lateral acceleration calculating section 100b. It is possible to derive resultant acceleration G according to a resultant vector which is the synthesis of two directional accelerations Xg, Yg acted upon the vehicle.

Rollover boundary line setting section 100d sets rollover boundary line L. Rollover boundary line L serves to divide a region into a rollover region β in which there is a high possibility of the occurrence of rollover of the vehicle (an overturn of the vehicle in the lateral direction) when lateral acceleration Yg and longitudinal acceleration Xg are applied to the vehicle and a non-rollover region as another region than rollover region β, namely, a stable region α. As described above, rollover boundary line L which divides the region into rollover region β and stable region α is a boundary line related to acceleration (Xg, Yg). In the first embodiment, rollover boundary line L is set on a line connecting points at each of which a wheel load at a turning inner wheel side indicates zero (a resultant acceleration G) when both of lateral acceleration Yg and longitudinal acceleration Xg are applied to the vehicle. As will be explained below, rollover boundary line L is set on a basis of specifications of the vehicle to which the control apparatus according to the present invention is applicable.

[Definition of Rollover Region]

An example of setting rollover region β (rollover boundary line L) will be described hereinbelow.

The present invention is not limited to the setting method which will be described below but an appropriate setting method can be selected.

In each of symbols, a subscript f denotes front road wheels, a subscript r denotes rear road wheels, a subscript x denotes a vehicular longitudinal direction, a subscript y denotes a vehicular lateral direction, respectively.

In general, steady-state front road wheel movement quantity $\Delta W_{\phi f}$ and steady-state rear road wheel movement quantity $\Delta W_{\phi r}$ are derived from equations (1) and (2) respectively, in a case where only the lateral acceleration is applied. In each of equations (1), (2), $m_s$ denotes a vehicle weight, $a_y$ denotes the lateral acceleration, $h_s$ denotes a distance between a roll center at a vehicular weight center position and the vehicular weight center, $K_{\phi f}$ denotes a front road wheel axle roll rigidity, $K_{\phi r}$ denotes a rear road wheel axle roll rigidity, g denotes a gravitational acceleration, $d_f$ denotes a front road wheel tread, $d_r$ denotes a rear road wheel tread, l denotes a wheel base, $l_f$ denotes a distance from the vehicle weight center to an axle of the front road wheels, $l_r$ denotes a distance from the vehicular weight center position to an axle of rear road wheels, $h_f$ denotes a road clearance of the front roll center, and $h_r$ denotes a road clearance of the rear roll center, respectively.

$$\Delta W_{\phi f} = \frac{a_y m_s}{d_f}\left[\frac{K_{\phi f} h_s}{K_{\phi f} + K_{\phi r} - m_s g h_s} + \frac{l_r}{l} h_f\right] \quad \text{(Equation 1)}$$

$$\Delta W_{\phi r} = \frac{a_y m_s}{d_r}\left[\frac{K_{\phi r} h_s}{K_{\phi f} + K_{\phi r} - m_s g h_s} + \frac{l_f}{l} h_r\right] \quad \text{(Equation 2)}$$

It should be noted that the above-described equations (1) and (2) have been described in Page 152 of a Japanese book titled as "VEHICLE DYNAMICS AND CONTROL" authored by Masato ABE published by Sankaidou in 1992.

On the other hand, a static wheel load is determined according to a relationship between the weight center and the vehicle weight center position. Hence, when only the lateral acceleration is acted, limit values $a_{yf0}$, $a_{yr0}$ of lateral accelerations that front road wheel load decrease quantity $\Delta W_{\phi f}$ and rear road wheel load decrease quantity $\Delta W_{\phi r}$ exceed the corresponding static wheel load can be represented by numerical equations (numerical equations (3) and (4)), respectively, as steady-state characteristics. It should be noted that the lateral acceleration is acted upon leftward and rightward directions of the vehicle, a positive value or negative value is resulted.

In addition, load decrease quantity $\Delta W_\phi$ of one of limit values $a_{yf0}$, $a_{yr0}$ for front and rear road wheels whose absolute value is smaller than the other thereof exceeds the static wheel load at an earlier timing. For example, in a case of $|a_{yf0}|>|a_{yr0}|$, the rear road wheels have started to become float from a road surface at the earlier timing than the front road wheels.

$$a_{yf0} = \pm \frac{l_r}{2l} g d_f \left[\frac{K_{\phi f} h_s}{K_{\phi f} + K_{\phi r} - m_s g h_s} + \frac{l_r}{l} h_f\right]^{-1} \quad \text{(Equation 3)}$$

$$a_{yr0} = \pm \frac{l_f}{2l} g d_r \left[\frac{K_{\phi r} h_s}{K_{\phi f} + K_{\phi r} - m_s g h_s} + \frac{l_r}{l} h_f\right]^{-1} \quad \text{(Equation 4)}$$

In addition, as far as the longitudinal acceleration is concerned, limit values $a_{xf0}$, $a_{xr0}$ can simply be represented supposing that a rotary axis of the pitching motion is substantially coincident with the weight center position. Limit values $a_{xf0}$, $a_{xr0}$ of longitudinal acceleration at which each of front road wheel load decrease quantity and rear road wheel decrease quantities $\Delta W_{\phi f}$, $\Delta W_{\phi r}$ which exceed the static weight load can be represented by the following equations (5) and (6).

$$a_{xf0} = \frac{l_r}{h_g} g \quad \text{(Equation 5)}$$

-continued $$a_{xr0} = \frac{l_f}{h_g}g \quad \text{(Equation 6)}$$

Hence, it becomes possible to narrow the lateral acceleration and the longitudinal acceleration at which at least wheel load decrease quantity $\Delta W_\phi$ becomes remarkable and at which the vehicular motion can become unstable down to four points of the lateral acceleration limit values $\pm a_{y0}$ determined from equations (3) and (4) (plus and minus two points of $a_{y0}$ whose absolute values are smaller than front and rear road wheel accelerations $a_{yf0}$, $a_{yr0}$ from among front and rear road wheel accelerations) and limit values of longitudinal accelerations $a_{xf0}$, $a_{xr0}$ derived from equations (5) and (6). In this first embodiment, rollover region $\beta$ of the vehicle is defined by connecting the respective points thus determined through an arbitrary line. In the technique defining rollover region $\beta$, a most simplest technique may be thought as a method in which the above-described respective points $\pm a_{y0}$, $a_{xf0}$, $a_{xf0}$, $a_{xr0}$ are connected with a straight line. A physical prerequisite of connecting these points with the straight line is the same as supposing that road wheel load movement quantity according to lateral acceleration $a_y$ and load movement quantity $\Delta W_\phi$ according to longitudinal acceleration $a_x$ are represented by a sum (a linear combination). Hereinafter, a case where the longitudinal acceleration is negative (deceleration) will be explained below and, for a case where the longitudinal acceleration is positive (acceleration), a way of thinking is the same so that the explanation thereof will, herein, be omitted. In addition, for the lateral acceleration, suppose that the lateral acceleration generated on the vehicle in a case where the vehicle is turned in a clockwise direction (a case where the driver feels a leftward lateral acceleration) is positive.

Figure 2:
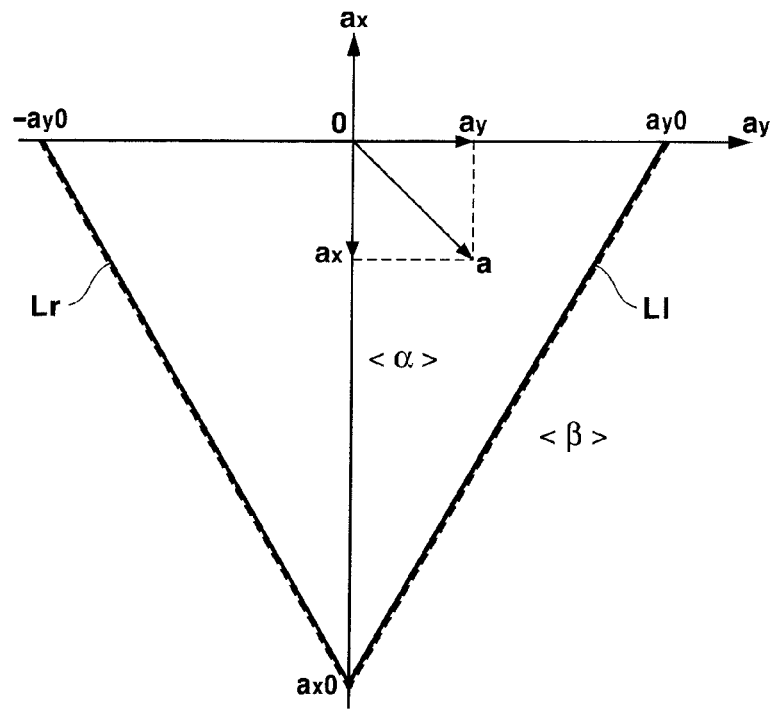
FIG. 2 is a coordinate system view with a longitudinal axis taken as a longitudinal acceleration and with a lateral axis taken as a lateral acceleration and representing a definition of a rollover region β of the vehicle.

FIG. 2 shows a coordinate system with the longitudinal axis taken as longitudinal acceleration $a_x$, the lateral axis taken as lateral acceleration $a_y$, and a point at which both of longitudinal acceleration $a_x$ and lateral acceleration $a_y$ indicate zero taken as an origin 0.

FIG. 2 shows an example of defining rollover region $\beta$ of the vehicle according to the method connecting the above-described four points $\pm a_{y0}$, $a_{xf0}$, and $a_{xr0}$ with the straight line.

In FIG. 2, one of $a_{xf0}$ and $a_{xr0}$ whose absolute value is smaller than the other is simply denoted by $a_{y0}$. In addition, one of $a_{xf0}$ and $a_{xr0}$ which is $a_{xr0}$ is simply denoted by $a_{x0}$. The above-described respective points $\pm a_{y0}$, $a_{xf0}$, $a_{xr0}$ are points at each of which a rear road weight at a turning inner wheel side indicates zero (load decrease quantity $\Delta W_{\phi r}$ of the rear road wheels exceeds the static wheel load) when lateral acceleration $a_y$ and longitudinal acceleration $a_x$ are applied to the vehicle and the straight line connecting these points is rollover boundary line L. The straight line connecting points of $-a_{y0}$ and $a_{x0}$ is a right rollover boundary line Lr. The straight line connecting points of $+a_{y0}$ and $a_{x0}$ is a left rollover boundary line L1.

Under the above-described assumption (prerequisite), the rear road wheel load of the turning inner wheel side at each point on both of rollover boundary lines L1, Lr can be assumed to become zero. Stable region $\alpha$ and rollover region $\beta$ are divided with rollover boundary lines L1, Lr as boundaries. The region at origin side 0 with rollover boundary lines L1, Lr as boundaries is stable region $\alpha$ and the other region is rollover region $\beta$. When a vehicular resultant acceleration a which is a synthesized vector of lateral acceleration $a_y$ and longitudinal acceleration $a_x$ falls within rollover region $\beta$ deviating from boundary lines L1, Lr, the rear road wheel load at the turning inner wheel side indicates zero. Thus, it can be predicted that there is a high possibility that the vehicular motion becomes unstable and the vehicle is overturned (or rolled over).

It should be noted that, in a case where $a_{yf0}$ is selected as $a_{y0}$, limit value $a_{xf0}$ becomes large since the front road wheel load becomes increased by the quantity corresponding to the reduced longitudinal acceleration (the deceleration becomes increased) during the deceleration. Hence, if the boundary line is corrected by the increase in the limit value, boundary line L does not become the straight line but becomes the curved line. In this case, it is recommended to define the rollover boundary line L in terms of a table or a function. At this time, if the magnitude relationship between $a_{yf0}$ and $a_{yr0}$ is reversed, one of the limit values which is lower than the other is selected and rollover boundary line L (L1, Lr) can be defined. It is, of course, that, in order to acquire the rollover boundary line with a higher accuracy, the regions of stable region ($\alpha$) and rollover region ($\beta$) may be defined by analytically deriving a wheel load variation developed when the lateral acceleration and the longitudinal acceleration are applied and with each point at which the derived load decrease quantity is below the static load defined as boundary line L. It is also possible to derive the above-described respective points experimentally through an actual vehicle. If these results are, for example, applied as the table function, boundary line L (rollover region $\beta$) can be defined with a higher accuracy.

[Detection of Rollover Tendency Due to a Resultant Acceleration]

Rollover tendency determining section 100e determines the rollover tendency of the vehicle on a basis of a magnitude of resultant acceleration G calculated from resultant acceleration calculating section 100c1. At this time, if resultant acceleration G is compared with rollover boundary line L and a distance (value) S by which resultant acceleration G moves and reaches to rollover boundary line L is smaller than a preset distance $S_0$, a determination that there is the tendency of rollover of the vehicle (the vehicle has the tendency of rollover of the vehicle) is made.

Figure 3:
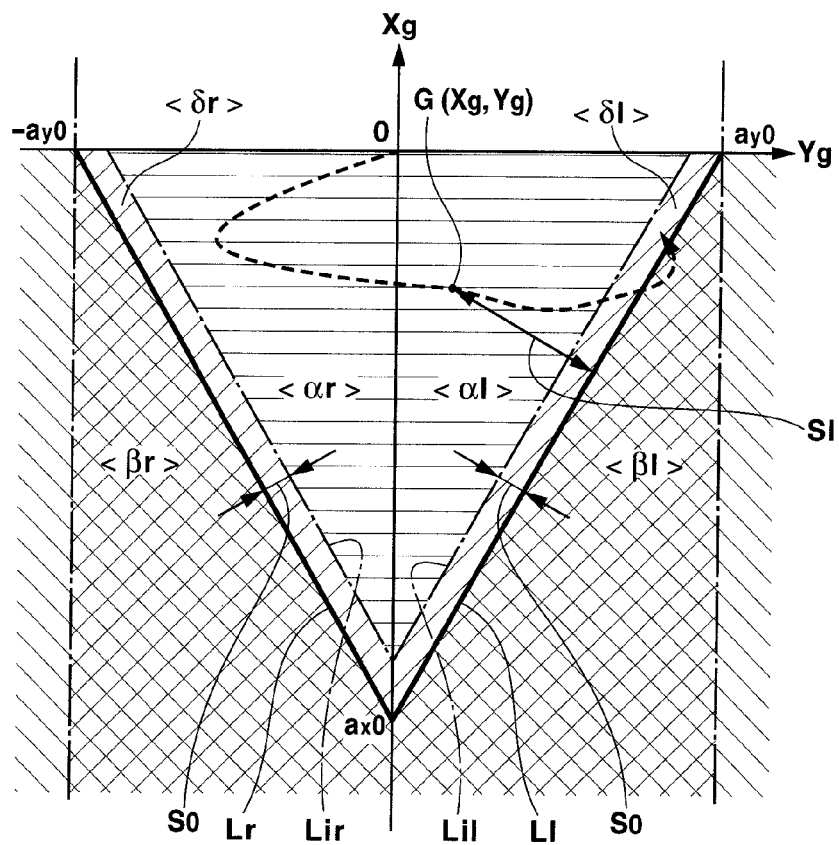
FIG. 3 is a coordinate system view with the longitudinal axis taken as the longitudinal acceleration and with the lateral axis taken as the lateral acceleration and representing the definition of rollover region β of the vehicle and the definition of a rollover tendency region δ of the vehicle.

FIG. 3 shows the coordinate system with the longitudinal axis taken as longitudinal acceleration Xg and the lateral axis taken as lateral acceleration Yg in the same way as FIG. 2 and representing the definition of rollover region $\beta$ and stable region $\alpha$ with rollover boundary line L as a boundary. A subscript 1 denotes a left side, a subscript r denotes a right side in each of symbols shown in FIG. 3.

In a case where the boundary of rollover region $\beta$ is defined as the straight line, a margin S from resultant acceleration G to rollover region $\beta$ (rollover boundary line L) can be calculated in an equation (7), as a shortest distance (on FIG. 3) from resultant acceleration G to each of left and right rollover boundary lines (boundary line L) L1, Lr.

(Equation 7)

$$S = \frac{|a_{x0} * Yg + a_{y0} * Xg - a_{x0} * a_{y0}|}{\sqrt{a_{y0}^2 + a_{x0}^2}} \quad \text{(Equation 7)}$$

On the other hand, distance $S_0$ is preset as a predetermined margin from an inner side of stable region $\alpha$ to rollover region $\beta$, as shown in FIG. 3. A region of a range provided by only distance $S_0$ to an inner side (a side of origin 0) within stable region $\alpha$ corresponds to a rollover tendency region $\delta$ in the first embodiment. Rollover tendency region $\delta$ is a region enclosed with a rollover tendency boundary line Li extended in parallel to this boundary line L with distance $S_o$ provided toward the inner side of stable region α. If resultant acceleration G falls within rollover tendency region δ, it can be predicted that the vehicle has the tendency of rollover since resultant acceleration G is easily transferred to rollover region β. It should be noted that, in a case where the rollover boundary line is not the straight line, the same purpose can be realized if points on boundary line L at which the margin (distance) to boundary line L provides maximum is arbitrarily calculated.

Since lateral acceleration Yg represents the roll motion of the vehicle and longitudinal acceleration Xg represents the pitching motion, resultant acceleration G represents the vehicular motion and its magnitude thereof represents the magnitude of the motion of the vehicle. In other words, rollover tendency determining section 100e calculates the vehicular motion on a basis of resultant acceleration G. On the other hand, if resultant acceleration G falls within the region at more inner side (a side of origin 0) than rollover tendency boundary line Li, the vehicular motion is so small to a degree that has no tendency of the rollover. In the way described above, the above-described region more inner side than rollover tendency boundary line Li is preset as a vehicular motion region having no tendency of rollover. In the first embodiment, rollover tendency determining section 100e determines that there is the tendency of rollover of the vehicle when calculated resultant acceleration G (vehicular motion) is larger than the above-described region (preset predetermined motion) and falls within rollover tendency region δ.

[Rollover Suppression Control]

Figure 4A:
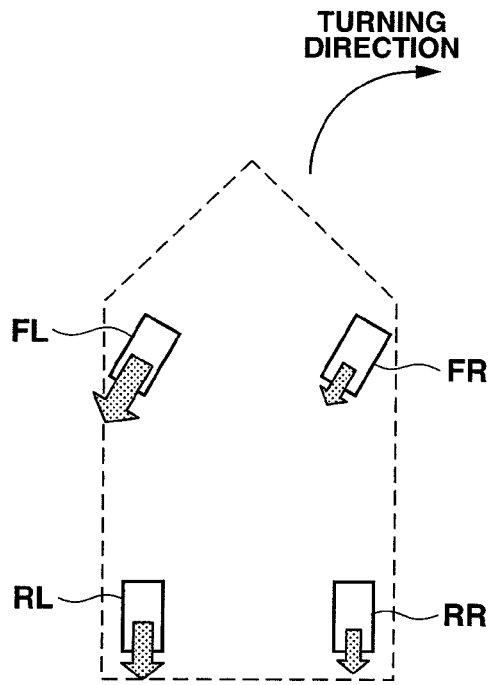
FIGS. 4A and 4B are explanatory view for explaining a method of application(s) of braking force(s) to respective road wheels or one of road wheels to suppress the rollover tendency of the vehicle, respectively.
Figure 4B:
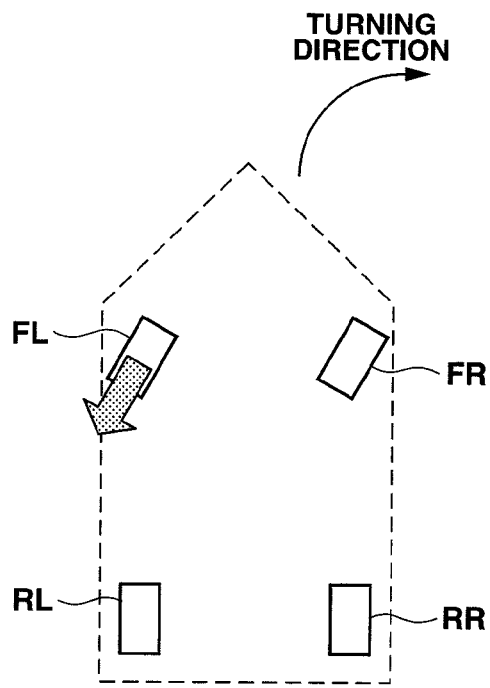

Brake control section 200 actuates liquid pressure unit (HU) 4 to give a braking force to at least one or each of the plurality of road (tire) wheels FL, FR, RL, RR to suppress the rollover tendency in a case where vehicular motion determining section 100 (rollover tendency determining section 100e) determines that the vehicle has the tendency of rollover. FIGS. 4A and 4B show an example of giving the driving forces to respective road wheels FL, FR, RL, RR to suppress the tendency of the rollover. The direction and magnitude of driving force acted upon each of road wheels FL, FR, RL, RR are represented by the direction of arrowed marks and magnitude thereof. FIG. 4A shows the example of giving the braking force to each of respective wheels FL, FR, RR, RL through brake control unit 200 in the first embodiment.

In a case where resultant acceleration G is determined to fall within rollover tendency region δ passing rollover tendency boundary line Li, brake control section 200 in the first embodiment gives the braking force to each of respective road wheels FL, FR, RL, RR to control a vehicle speed V. Thus, resultant acceleration G is forced to fall within stable region α at a more origin side than rollover tendency region δ. That is to say, lateral acceleration Yg is proportional to vehicle speed V and a yaw rate γ (refer to an equation (8)). Therefore, if yaw rate γ is constant, vehicle speed V is decreased so that lateral acceleration Yg becomes small. Thus, it becomes possible to make resultant acceleration G (vehicular motion) small so that resultant acceleration G can be placed within stable region α at more origin side than rollover tendency region δ.

Figure 5:
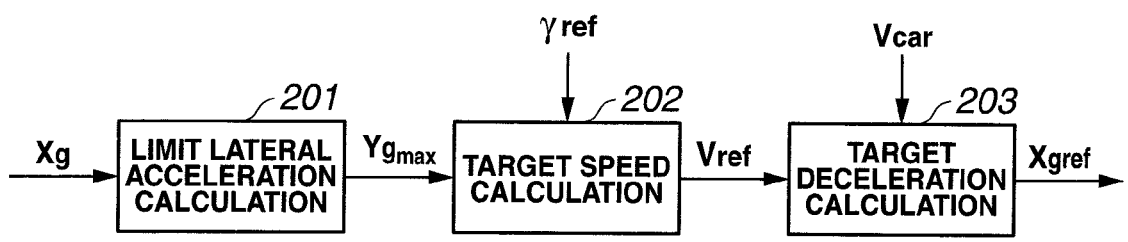
FIG. 5 is a calculation block diagram of a brake control section 200 shown in FIG. 1B to suppress the rollover tendency of the vehicle.

FIG. 5 shows a calculation block diagram of brake control section 200. This calculation is executed when vehicular motion determining section 100 (rollover tendency determining section 100e) detects the tendency of rollover of the vehicle. Brake control section 200 includes: a limit lateral acceleration calculating section 201; a target speed calculating section 202; and a target deceleration calculating section 203. Limit lateral acceleration calculating section 201 calculates a maximum lateral acceleration $Yg_{max}$ at which resultant acceleration G does not deviate rollover tendency boundary line Li on a basis of detected longitudinal acceleration Xg. This is easily calculated if, for example, boundary tendency boundary line Li is prepared with a table. Maximum lateral acceleration $Yg_{max}$ is a value of lateral acceleration corresponding to the detected longitudinal acceleration Xg on rollover tendency boundary line Li. Target speed calculating section 202 calculates a target vehicle speed $V_{ref}$ that can satisfy maximum lateral acceleration $Yg_{max}$ in equation (8) on a basis of a target yaw rate $\gamma_{ref}$. Target yaw rate $\gamma_{ref}$ can be determined from an actual yaw rate $\gamma_{sen}$ (corresponds to a yaw rate that the vehicle driver has desired) detected by vehicular motion sensor unit 10 (yaw rate sensor 19) or a yaw rate $\gamma_{angle}$ (the yaw rate that the vehicle driver has requested) corresponding to the steering angle detected by steering angle sensor 15. Target vehicle speed calculating section 202 calculates target vehicle speed $V_{ref}$ in a vehicular linear region in which the yaw rate to the steering operation can be obtained in the way the rate thereof is desired.

$$V\text{ref}=Yg_{max}/\gamma_{ref} \qquad \text{(Equation 8)}$$

Target deceleration calculating section 203 sets a vehicular target deceleration $Xg_{ref}$ according to a deviation between prepared target vehicle speed $V_{ref}$ and detected vehicle speed (a vehicle body speed) Vcar. Vehicle speed Vcar can be calculated on a basis of road wheel revolution speeds detected by means of road wheel speed sensors 11 through 14. Target deceleration $Xg_{ref}$ can be calculated through a division calculation of the speed deviation and a target braking time and may be calculated using a table setting. Brake control section 200 actuates liquid pressure unit 4 with target deceleration $Xg_{ref}$ as a command value to provide the braking force for at least one or each of respective road wheels FL, FR, RL, RR.

[Action in the First Embodiment]

Figure 6:
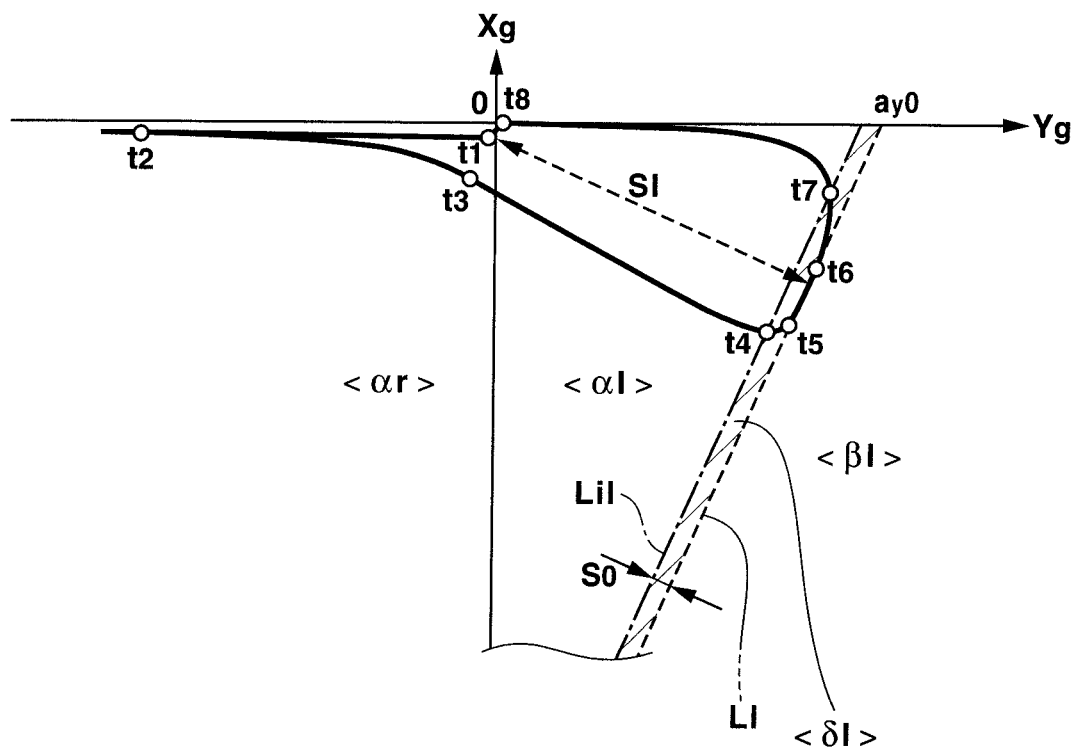
FIG. 6 is a coordinate system view with the longitudinal axis taken as the longitudinal acceleration and with the lateral axis taken as the lateral acceleration and representing a locus of a resultant acceleration on the coordinate system.
Figure 7:
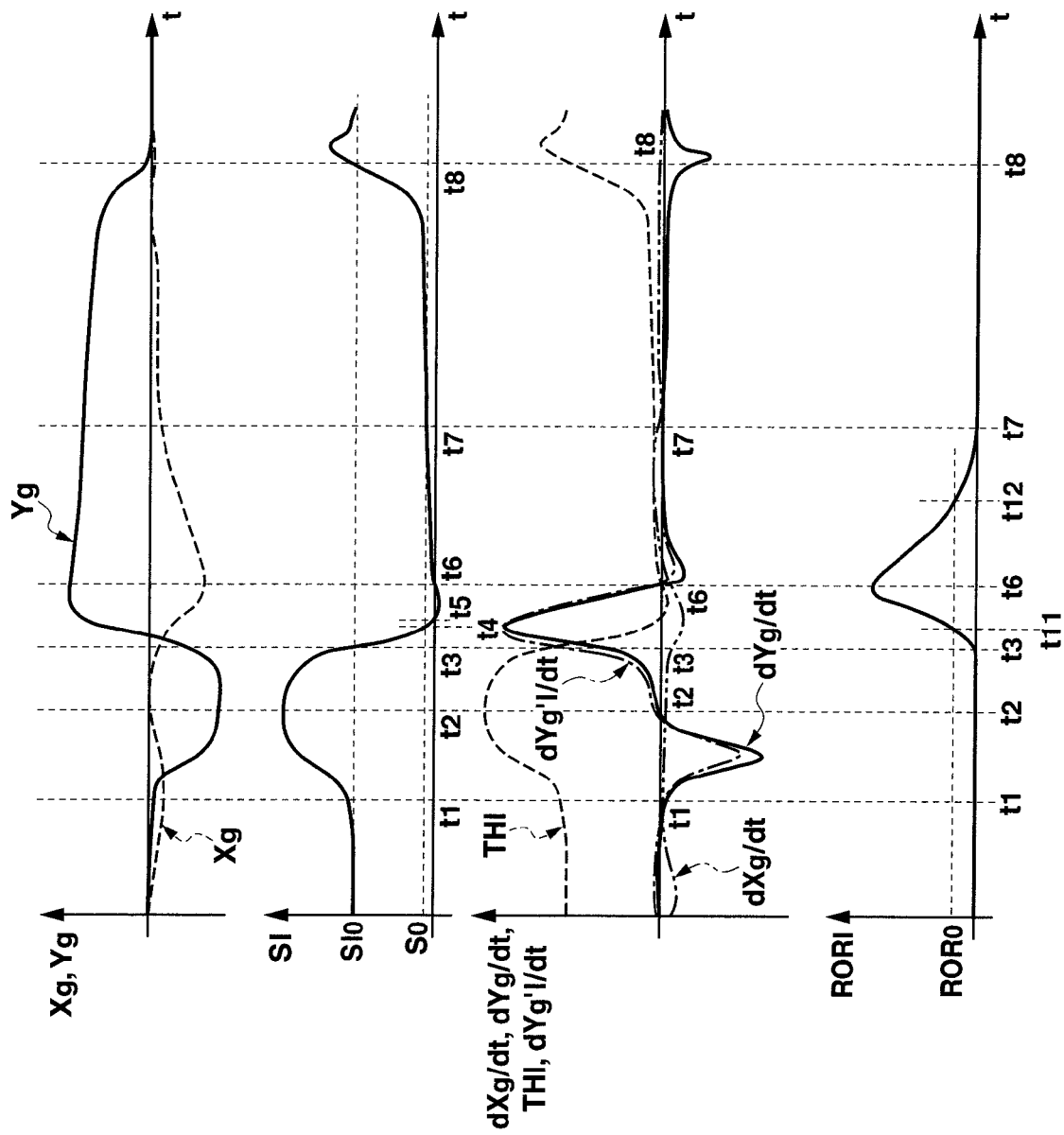
FIGS. 7A, 7B, 7C, and 7D are integrally a timing chart representing time series of respective variables in an operation example shown in FIG. 6.

FIG. 6 shows the coordinate system, in the same way as FIG. 3, in which the longitudinal axis is taken as longitudinal acceleration Xg and the lateral axis is taken as lateral acceleration Yg and in which left rollover boundary line Ll and left rollover tendency boundary line Lli are set. In addition, FIG. 6 shows a locus of resultant acceleration G (Xg, Yg) in a case where an abrupt steering operation is carried out by the vehicle driver as an example of operation. In addition, FIGS. 7A, 7B, 7C, and 7D show timing charts representing time series of each of variables in the operation example shown in FIG. 6. FIG. 7A shows time variations of longitudinal and lateral accelerations Xg, Yg and FIG. 7B shows the time variation of margin S to left rollover boundary line Ll. It should be noted that, for the rightward rollover direction in the same data, only the difference in the boundary line is resulted. Hence, its explanation thereof will, herein, be omitted. It should be noted that FIGS. 7C and 7D will be described later.

At a time duration before a time point steering wheel SW is in a neutral state, lateral acceleration Yg is substantially zero, and longitudinal acceleration Xg is slightly reduced. At time point t1, a counterclockwise steering operation is started so that negative (minus) lateral acceleration Yg is developed. Resultant acceleration G is advanced toward an opposite direction to left rollover boundary line Ll so that resultant acceleration G becomes far away from left rollover boundary line Ll. At this time, margin Sl is increased and is larger than a value Sl0 of margin at origin 0. At a time point t2, a return of steering wheel SW to a neutral state (clockwise steering operation) is carried out so that lateral acceleration Yg is increased toward the positive direction thereof. In addition, longitudinal acceleration Xg is started to be decreased toward the negative direction. Resultant acceleration G is advanced to approach to left rollover boundary line L1. At this time, margin Sl is decreased. At a time point t4, margin Sl becomes lower than (below) a predetermined value $S_0$. That is to say, resultant acceleration G falls within rollover tendency region δ passing left rollover tendency boundary line Lil. At a time point t5, margin Sl becomes lower than (below) zero. That is to say, resultant acceleration G falls slightly within rollover region β passing left rollover boundary line L1. In the first embodiment, it is assumed that the vehicle does not roll over in this state. Thereafter, longitudinal acceleration Xg is started to increase in the positive direction and lateral acceleration Yg is started to decrease in the negative direction. At a time point t6, margin Sl becomes increased and exceeds zero. That is to say, resultant acceleration G falls again within rollover tendency region δ passing left rollover boundary line L1. Resultant acceleration G is advanced toward the direction which becomes remote from left rollover boundary line L1. At a time point t7, margin Sl becomes increased and exceeds predetermined value $S_0$. That is to say, resultant acceleration G falls again within stable region αl passing left rollover tendency boundary line Lil. Resultant acceleration G is advanced toward the direction remote from left rollover boundary line L1. At a time point t8, both of lateral acceleration Xg and longitudinal acceleration Yg are converged toward zero and resultant acceleration G becomes approached to origin 0. As described above, rollover tendency determining section 100e determines that there is the tendency of rollover of the vehicle at time duration from time point t4 to time point t7 in which margin Sl becomes lower than (below) predetermined value $S_0$ (resultant acceleration G falls within rollover tendency region δ and rollover region β).

That is to say, utilizing resultant acceleration G of longitudinal acceleration Xg and lateral acceleration Yg, it becomes possible to monitor quantitatively a steady-state motion of the vehicle and to represent quantitatively the tendency of rollover of the vehicle. Thus, it becomes possible to detect the tendency of rollover of the vehicle, for example, by determining whether the vehicular motion (resultant acceleration G) falls within rollover region β (or rollover tendency region δ). Specifically, the tendency of rollover of the vehicle is detected in a case where margin S to rollover boundary line L (rollover region β) is small.

[Action and Advantage of the First Embodiment with Respect to a Comparative Example to the Present Invention]

A first comparative example to the control apparatus for the vehicle according to the present invention, the control apparatus detecting the tendency of rollover of the vehicle in a case where an abrupt steering operation occurs, for example, in order to avoid a collision against an obstacle in case of emergency and varying an output of an actuator by which the vehicular motion is controllable to suppress the tendency of rollover of the vehicle, is an apparatus for determining that there is a possibility of the occurrence of rollover of the vehicle on a basis of the steering angle and a steering angular speed. A second comparative example is an apparatus in which a variable representing a lateral directional dynamic characteristic of the vehicle is prepared using the lateral acceleration of the vehicle and a lateral jerk which is the variation of the lateral acceleration per unit of time and the tendency of rollover of the vehicle is detected in a case where the value of the variable is in excess of a predetermined value previously determined from experiments (empirically determined value).

However, for the former apparatus (first comparative example), even if a steering situation is monitored, the steering situation cannot always provide a source of determination of whether the vehicle indicates actually the rollover motion. For example, in a case where a frictional force between each road wheel and a road surface (road surface frictional coefficient μ) is varied, the vehicular motion corresponding to the steering operation does not always appear. Hence, a determination accuracy of the tendency of rollover of the vehicle may become insufficient. In addition, for the latter apparatus (second comparative example), the rollover tendency of the vehicle is not determined only by the lateral motion of the vehicle in the meaning of uniqueness. That is to say, in a case where the longitudinal acceleration is simultaneously applied to the vehicle in addition to the lateral acceleration, the vehicle simultaneously indicates such a motion variation as the pitching motion in addition to the rolling motion. Hence, for example, a vertical load applied to one of the rear road wheels which corresponds to the turning inner wheel becomes smaller. Hence, the tendency of rollover of the vehicle becomes higher. It should, herein, be noted that a vehicle body provides many factors developing the longitudinal acceleration such as a rolling friction of each of the road wheels, air resistance, an engine brake, a road surface gradient, and so forth. Furthermore, a traveling state from which the tendency of rollover of the vehicle is to be detected is not an ordinary travel so as to maintain a constant speed but a case where the vehicular motion is large. In such a state as described above, it can be said that the longitudinal acceleration is always applied to the vehicle. As described above, there is a possibility that the determination accuracy of the tendency of rollover becomes insufficient only by the monitoring of the lateral acceleration.

Over against this, the control apparatus in the first embodiment according to the present invention determines the tendency of rollover of the vehicle on a basis of a plurality of accelerations (Xg, Yg) acted upon the vehicle in plural directions not depending upon only the steering angle (which is a parameter on which the vehicular motion cannot be said to be accurately reflected) and only lateral acceleration Yg (which is a parameter on which the tendency of rollover is partially reflected). Specifically, the vehicular control apparatus in the first embodiment calculates the acceleration in two directions acted upon the vehicle as the parameter of the vehicular motion on which the tendency of rollover of the vehicle is reflected and determines that there is the tendency of rollover of the vehicle when the vehicular motion represented by the two sets of accelerations (two directional accelerations) is larger than a preset predetermined motion. Thus, the determination accuracy of the tendency of the vehicle can be improved. In other words, since the loads applied to respective road wheels FL, FR, RL, RR are considered on a basis of an acceleration set in plural directions (specifically, resultant acceleration G) and the tendency of rollover is determined on a basis of the magnitude of the wheel loads. Thus, the determination accuracy of the tendency of rollover of the vehicle be improved.

For example, in FIG. 3, under such a condition that longitudinal acceleration Xg in the vehicular longitudinal (forward-and-backward) direction is zero, there is least possibility of the occurrence of rollover of the vehicle if magnitude of lateral acceleration Yg is smaller than $a_{y0}$. However, even if the magnitude of Yg is smaller than $a_{y0}$, a meshing portion is rollover region β (βl, βr) over which the wheel load is decreased when longitudinal acceleration (deceleration) Xg is developed and in which there is a high possibility of the occurrence of rollover of the vehicle. Suppose a case such that the determination of the tendency of rollover of the vehicle is made only on a basis of lateral acceleration Yg without consideration of the influence of longitudinal acceleration Xg and the determination that there is the tendency of rollover of the vehicle only in a case where the magnitude of Yg is in excess of predetermined value (limit value) $a_{y0}$. In this case, the determination is made that there is no tendency of rollover of the vehicle even in the region of the meshing portion shown in FIG. 3. However, in the case of the control apparatus for the vehicle in the first embodiment, the region denoted by the meshing portion in FIG. 3 can be determined as rollover region β due to the use of at least two direction accelerations Xg, Yg. Thus, the determination accuracy of the tendency of rollover of the vehicle can accordingly be increased. In other words, a detection sensitivity to the rollover of the vehicle can be improved more remarkably by the monitoring of not only the variation of lateral acceleration Yg but also the variation of longitudinal acceleration Xg rather than the case where only the variation of lateral acceleration Yg is monitored.

It should be noted that the accelerations in plural directions may be those on which the vehicular motions (wheel loads) in the above-described traveling state in which the tendency of rollover is to be detected are reflected. Not only the accelerations in a horizontal plane to the road surface but also, for example, accelerations in a direction having a certain angle with respect to the road surface may be used. In addition, in addition to two direction accelerations within the plane horizontal to the road surface, the accelerations in the direction having the certain angle to the road surface may be used. In the first embodiment, the accelerations in the two directions within the plane horizontal to the road surface, specifically, longitudinal acceleration Xg and lateral acceleration Yg are detected and resultant acceleration G which is the synthesis of these accelerations Xg, Yg is used. Hence, the vehicular motion (wheel loads) can accurately be detected with a simple structure. The directions of accelerations detected within the plane horizontal to the road surface may not be fixed to the longitudinal direction of the vehicle and the lateral direction thereof. The accelerations may be detected by two arbitrary axes horizontal to the road surface (provided that a sinusoidal value of an angle formed by the two axes does not indicate zero). According to the vector synthesis of these accelerations, the resultant acceleration cab be calculated. As alternative, the resultant acceleration may be calculated by detecting a time variation of the vehicular motion within the plane horizontal to the road surface utilizing a global positioning system (GPS).

In the control apparatus for the vehicle of the first preferred embodiment, longitudinal and lateral accelerations Xg, Yg are detected using the signals from sensors 17, 18 in the vehicle having a vehicular motion sensor unit 10 (longitudinal acceleration sensor 17 and lateral acceleration sensor 18). Thus, in general, longitudinal acceleration sensor and the lateral acceleration sensor are equipped in the vehicle in which the actuator by which the vehicular motion is controllable is mounted. Since the tendency of rollover of the vehicle can be determined using only these sensors 17, 18, the structure of the apparatus can be simplified and the increase in cost can be suppressed. It should be noted that, when resultant acceleration G is calculated, longitudinal acceleration Xg and lateral acceleration Yg may be calculated according to an estimation from any other parameters or another parameter not depending upon the detected value obtained from sensor unit 10. For example, lateral acceleration Yg may be estimated from a vehicle body speed V derived from yaw rate γ (yaw rate sensor 19) and road wheel revolution speeds (road wheel speed sensors 11, 12, 13, 14), may be estimated from the steering angle, or may be estimated from a deviation between the road wheel revolution speeds. Longitudinal accelerations Xg may be determined from a differentiation of vehicle body speed V with respect to time derived from the road wheel (revolution) speeds. Or alternatively, estimation values calculated by these estimations may be used for the calculation of longitudinal acceleration Xg.

The control apparatus in the first embodiment calculates resultant acceleration G as a resultant acceleration information and determines the tendency of rollover of the vehicle on a basis of the magnitude of a resultant acceleration information (resultant acceleration G). Specifically, rollover boundary line L is set and the resultant acceleration information is compared with rollover boundary line L. Rollover boundary line L is set to determine whether the vehicular motion represented by resultant acceleration G is in excess of the preset predetermined motion (the motion having the tendency of rollover of the vehicle). In other words, rollover boundary line L is a line related to the acceleration representing the magnitude of the predetermined motion (motion having the tendency of rollover). In this way, the magnitude of the tendency of rollover of the vehicle can easily be determined by dividing the region of the vehicular motion represented by the resultant acceleration information (resultant acceleration G) through rollover boundary line L. In addition, as appreciated from the above-described equations of (3) through (6) which calculate acceleration limit values of $a_{x0}$, $a_{y0}$ for prescribing rollover boundary line L, rollover boundary line L is set on a basis of specifications of the vehicle. Thus, the tendency of rollover of the vehicle in accordance with characteristics of the vehicle can accurately be determined and special detecting means becomes unnecessary for detecting any parameter to set rollover boundary line L. Thus, the structure can be simplified. In addition, rollover boundary line L is a line connecting points at each of which the wheel loads of the turning inner wheels indicate zero when longitudinal acceleration Xg and lateral acceleration Yg are applied. Hence, the determination accuracy of the tendency of rollover of the vehicle can be improved by determining the tendency of rollover of the vehicle on a basis of the decrease in each of the wheel loads. It should be noted that the decrease in each of the wheel loads may be detected by the wheel load of any one of road wheels FL, FR, RL, RR which is decreased to the vicinity to zero. While the vehicle is turned, the loads on the turning inner wheels are decreased. Hence, with the wheel loads on the turning inner wheels as a reference, the decrease in the wheel load, namely, the increase in the tendency of rollover of the vehicle can more effectively be detected at an earlier timing than the case where the tendency of rollover of the vehicle is determined with the wheel load of one of turning outer wheels as a reference. It should be noted that boundary line L is the line connecting the points at each of which the wheel load is zero or may be the line connecting the points at each of which the wheel load approaches to the vicinity of zero.

The control apparatus in the first embodiment determines that there is the tendency of rollover of the vehicle when distance (margin) S by which resultant acceleration G moves and reaches to rollover boundary line L is smaller than preset (predetermined) distance $S_0$. The provision of predetermined margin (distance) $S_0$ can simplify a determination logic and can detect a probability of the rollover at a stage before resultant acceleration G is increased and is transferred into rollover region β (the wheel load indicates zero). Thus, a more accurate suppression of the tendency of rollover of the vehicle can be made using the brake actuator.

The vehicle is provided with liquid pressure unit (HU) 4 as the brake actuator giving the braking force to at least one or each of respective road wheels FL, FR, RL, RR. Brake control section 200 actuates liquid pressure unit 4 when determining that there is the tendency of rollover of the vehicle. Thus, the control apparatus for the vehicle in the first embodiment can suppress the vehicular motion in accordance with the determination that there is the tendency of rollover of the vehicle. Specifically, brake control section 200 actuates liquid pressure unit 4 with target deceleration $Xg_{ref}$ as a command value to provide the braking force for at least one or each of respective road wheels FL, FR, RL, RR such that resultant acceleration G moves and reaches to calculated rollover tendency boundary line Li. That is to say, if the vehicle is decelerated to reach to calculated target vehicle speed $V_{ref}$, resultant acceleration G is positioned on rollover tendency boundary line Li and is suppressed to pass boundary line Li. Hence, the tendency of rollover of the vehicle can be suppressed. It should be noted that resultant acceleration G is at all times varied but, in the first embodiment, target vehicle speed $V_{ref}$ is varied with latest values of sensors always as a basis. Thus, in the first embodiment, the control apparatus can respond to the vehicular motion variation during the control.

It should be noted that the braking force may be provided for at least one or each of respective road wheels FL, FR, RL, RR in order for the magnitude of resultant acceleration G to be reduced so that resultant acceleration G may be controlled to be positioned within stable region α.

In addition, apart from (or together with) resultant acceleration G being made small as described above, liquid pressure unit 4 may be controlled so that a resultant jerk dG/dt which is a change rate of resultant acceleration G with respect to time becomes small. For example, limitation may be provided for the change rate (a longitudinal jerk dXg/dt) of longitudinal acceleration Xg (target deceleration $Xg_{ref}$) with respect to time. In this case, such a situation that the tendency of rollover of the vehicle is promoted due to the abrupt variation of resultant acceleration G can be suppressed. In addition, in the first embodiment, brake control section 200 controls resultant acceleration G to fall within a region toward a more inner side than rollover tendency boundary line Li (toward origin side), namely, stable region α not including rollover tendency region δ in a case where there is the tendency of rollover of the vehicle. However, resultant acceleration G may be controlled to fall within a region more inner side than rollover boundary line L, namely, within stable region α including rollover tendency region δ.

Next, an incidental rollover suppression action when a vehicular deceleration (a negative longitudinal acceleration Xg) is developed while vehicle speed Vcar is reduced to target vehicle speed $V_{ref}$ will be described below by dividing the explanation thereon into (A) and (B).

(A) As shown in FIG. 3, a magnitude of an intercept $a_{yo}$ of rollover boundary line L at lateral acceleration side Yg (lateral axis of FIG. 3) is smaller than the magnitude of another intercept $a_{xo}$ of rollover boundary line L at longitudinal acceleration side Xg (longitudinal axis of FIG. 3). In other words, a change rate (change quantity) (a gradient) of lateral acceleration Yg with respect to longitudinal acceleration Xg in rollover boundary line L is relatively small. Even if longitudinal acceleration Xg is more or less varied, a variation of a distance (in the direction of lateral acceleration Yg (lateral axis) from resultant acceleration G to rollover boundary line L (and rollover tendency boundary line Li in parallel to this rollover boundary line) is small. Therefore, even when the magnitude of longitudinal acceleration Xg is increased in order to develop the deceleration corresponding to target deceleration $Xg_{ref}$ in a case where resultant deceleration G is positioned within rollover tendency region δ passing rollover tendency boundary line Li, this increase in the magnitude of longitudinal acceleration Xg causes lateral acceleration Yg to be suppressed to become remote from rollover tendency line Li toward rollover region β side. That is to say, resultant acceleration G is suppressed from being transferred onto rollover region β side. It should be noted that since the limitation (upper limit value) is placed for the change rate of longitudinal acceleration Xg (target deceleration $Xg_{ref}$), the change rate of resultant acceleration G developed on the vehicle with respect to time (hereinafter, also referred to as a jerk) may be made small. In this case, a promotion of the tendency of rollover of the vehicle due to an abrupt acceleration variation and a worsening of a driving feeling can be suppressed and noises during the calculations of resultant acceleration G and so forth can be reduced.

Figure 8:
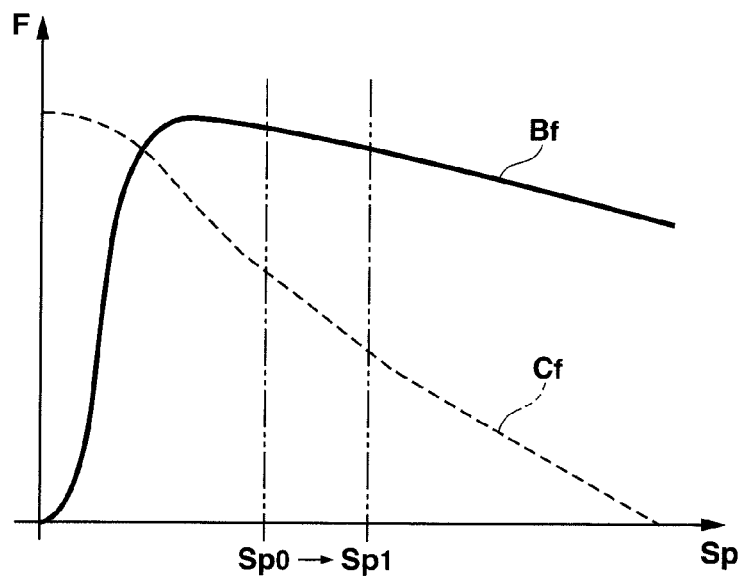
FIG. 8 is a characteristic graph representing a relationship between a slip rate of a road wheel and a force acted upon a tire of the road wheel.

(B) In addition, in a case where control unit 1 is installed to enable an anti-lock brake control (hereinafter, referred to as an ABS), the rollover of the vehicle is suppressed as will be described below even when the ABS is intervened during the reduction of vehicle speed Vcar to target vehicle speed $V_{ref}$. FIG. 8 shows a characteristic graph representing a relationship between a slip ratio of a representative road wheel and a force F acted upon a tire (the representative road wheel tire) (force F is divided into braking force Bf and a cornering force Cf). If braking force Bf (wheel cylinder liquid pressure) corresponding to target deceleration $Xg_{ref}$ is given to each road wheel FR, FL, RL, RR, slip ratio Sp of at least one of these braking wheels is sometimes increased. If, at this time, slip ratio Sp of a certain road wheel exceeds, for example, a threshold value Sp0, control unit 1 actuates ABS and issues a command to liquid pressure unit 4 to reduce the wheel cylinder liquid pressure of the corresponding (certain) road wheel to reduce slip rate Sp. The decrease of slip rate Sp causes cornering force Cf of the corresponding (certain) road wheel to be secured (an excessive decrease is suppressed). With this fact as a prerequisite, suppose a case where the same wheel cylinder liquid pressure is provided for each road wheel FL, FR, RL, RR in order for brake control section 200 to realize target deceleration $Xg_{ref}$ during the turning of the vehicle, for example, a case where slip ratios Sp of all of four road wheels FL, FR, RL, RR become large and ABS has been activated. Since the loads on respective road wheels FL, FR, RL, RR are different from one another, there is the tendency such that, as shown by arrow marks in FIG. 4A, the braking forces of turning outer wheels FL, RL on which the loads (tire friction forces) are relatively large, particularly, braking force Bf of front road wheel side FL is large and braking forces Bf of turning inner wheel sides FR, RR are small. At this time, slip ratios Sp for all four wheels FL, FR, RL, RR become (the vicinity to threshold value Sp0) larger than an ordinary value. Hence, since the decrease in cornering force Cf is developed at the approximately same time as the deceleration. Thus, lateral acceleration Yg is decreased. In addition, the decrease in cornering force Cf causes the vehicle to be in the tendency of an understeer. Since yaw rate γ is decreased, lateral acceleration Yg is also decreased in proportion to yaw rate γ. Furthermore, since braking forces Bf of turning outer wheels FL, RL (refer to FIG. 4A) are larger than those of turning inner wheels FR, RR, the vehicle becomes in the tendency of understeer. As described above, even if ABS is intervened during the reduction of vehicle speed B to target vehicle speed $V_{ref}$, lateral acceleration Yg is decreased and the deviation of resultant acceleration G (the vehicular motion) toward rollover region β is suppressed. Hence, the tendency of rollover of the vehicle can be suppressed.

It should be noted that since, if ABS is activated, cornering force Cf (by the magnitude approximately corresponding to slip ratio Sp0 in which ABS is intervened) is secured to some extent, there is a possibility of the insufficient decrease in lateral acceleration Yg. Hence, when determining that there is the tendency of rollover of the vehicle, slip ratio Sp0 at which ABS is intervened may be set to be larger than that when determining that there is no tendency of rollover of the vehicle (for example, Sp0 may be set to a value of Sp1 in FIG. 8). In this way, in a scene in which the rollover is needed to be suppressed, the intervention of ABS (the increase in cornering force Cf) is suppressed so that lateral acceleration Yg is sufficiently decreased and the vehicle can be forced to be in the understeer tendency. Consequently, the performance of the rollover suppression can be improved. In other words, utilizing the characteristic shown in FIG. 8 such that the decrease quantity of cornering force Cf with respect to the increase in slip ratio Sp is larger than the decrease quantity of braking force Bf, braking force Bf is secured to some extent while cornering force Cf is sufficiently decreased by intentionally enlarging slip ratio Sp in a scene in which the suppression of rollover is needed to be suppressed. Therefore, it becomes possible to reduce vehicle speed V speedily to target vehicle speed $V_{ref}$. Thus, lateral acceleration Yg is effectively decreased and the tendency of rollover of the vehicle can be suppressed.

[Effects of the Control Apparatus for the Vehicle in the First Embodiment]

The following lists the effects (advantages) that the vehicular control apparatus in the first embodiment exhibits.

(1) Control unit 1 is provided with resultant acceleration calculating section 100c1 configured to calculate resultant acceleration G which is the synthesis of two direction accelerations (Xg, Yg) acted upon the vehicle; and rollover tendency determining section 100e configured to determine the tendency of rollover of the vehicle using the calculated resultant acceleration G.

Thus, the determination accuracy of the tendency of rollover of the vehicle can be improved.

(2) Control unit 1 is provided with rollover boundary line setting section 100d configured to set rollover boundary line L related to the accelerations to determine the tendency of rollover of the vehicle by the comparison with calculated resultant acceleration, the rollover boundary line L being set on a basis of the vehicle specifications. Thus, the structure of the apparatus can be simplified.

(3) Rollover boundary line L is the line connecting the points at each of which the wheel loads of the turning inner wheels are zero when lateral acceleration Yg and longitudinal acceleration Xg are applied to the vehicle. Thus the determination accuracy can be improved.

(4) Control unit 1 determines that there is the tendency of rollover of the vehicle when distance S by which calculated resultant acceleration G moves and reaches to rollover boundary line L is smaller than preset distance $S_0$. Thus, the tendency of rollover of the vehicle can speedily be determined.

(5) The vehicle is provided with a brake actuator (corresponding to liquid pressure unit 4) which can provide the braking force for at least one or each of road wheels FL, FR, RL, RR installed on the vehicle and control unit 1 is provided with brake control section 200 configured to actuate the brake actuator when rollover tendency determining section 100e determines the tendency of rollover of the vehicle. Thus, the tendency of rollover of the vehicle can be suppressed.

(6) Brake control section 200 provides the braking force for at least one or each of plurality of road wheels FL, FR, RL, RR such that resultant acceleration G or resultant jerk dG/dt becomes small (becomes smaller than a predetermined resultant acceleration or a predetermined jerk). Thus, a promotion of the tendency of rollover of the vehicle can be suppressed.

(7) Control unit 1 is provided with acceleration calculating section 100a, 100b configured to calculate two directional accelerations (Xg, Yg) acted upon the vehicle; resultant acceleration information calculating section 100c related to resultant acceleration G to which the respective accelerations are synthesized; and rollover tendency determining section 100e configured to determine the tendency of rollover of the vehicle on a basis of the magnitude of calculated resultant acceleration information and control unit 1 actuates the brake actuator (liquid pressure unit 4) configured to provide the braking force for at least one or each of respective road wheels FL, FR, RL, RR installed on the vehicle. Thus, the determination accuracy of the tendency of rollover of the vehicle can be improved.

(8) Acceleration calculating section 100a, 100b is provided with longitudinal acceleration calculating section 100a configured to calculate longitudinal acceleration Xg of the vehicle and lateral acceleration calculating section 100b configured to calculate lateral acceleration Yg of the vehicle and control unit 1 is provided with resultant acceleration information calculating section 100c in which resultant acceleration G is calculated on a basis of calculated longitudinal acceleration Xg and calculated lateral acceleration Yg. Thus, the structure of the vehicular control apparatus can be simplified.

(Second Embodiment)

In the control apparatus for the vehicle in a second preferred embodiment according to the present invention, a method providing the braking force for at least one or each of the respective road wheels by means of brake control section 200 is different from the first embodiment. The other structures are the same as those in the case of the first embodiment. Hence, the description on these structures in the second embodiment will, herein, be omitted.

FIG. 4B shows the method of providing the braking force by means of brake control section 200 in the second embodiment. Brake control section 200 in the second embodiment provides the braking forces for turning outer wheels (FL, RL in FIG. 4B), for example, the braking force only for one of front wheels (left front wheel FL in FIG. 4B) to control yaw rate γ of the vehicle such that resultant acceleration G falls within stable region α at the more inner side (origin 0 side) than rollover tendency region δ in a case where resultant acceleration G is determined to fall within rollover tendency region δ passing rollover tendency boundary line Li. That is to say, lateral acceleration Yg is proportional to vehicle speed V and yaw rate γ (refer to equation (8)). Hence, if vehicle speed V is constant, lateral acceleration Yg becomes small by the decrease in yaw rate γ. Specifically, when the braking forces are provided for turning outer wheels (FL, RL in a case of FIG. 4B), a yaw moment in a opposite direction to the vehicular turning direction is developed so as to make yaw rate γ developed on the vehicle small. Consequently, lateral acceleration Yg is decreased. It should be noted that, in a case where a steer-by-wire apparatus by which steered angles of road wheels FL, FR, RL, RR are arbitrarily controllable is provided in the vehicle, the same purpose can be realized by controlling turning angles of respective road wheels FL, FR, RL, RR so as to suppress the increase in the yaw moment.

In addition, in a case where control unit 1 is installed so as to enable an execution of a stability control (hereinafter, referred to as VDC), there is often the case where control unit 1 actuates VDC on a basis of the determination that the vehicle is in the state of the understeer when yaw rate γ of the vehicle is suppressed as described above in order to suppress the rollover of the vehicle and provides the braking force for at least one or each of respective road wheels FL, FR, RL, RR to increase the yaw moment of the vehicle. In this case, cornering force Cf (lateral acceleration Yg) is increased so that there is a possibility of the promotion of the tendency of rollover of the vehicle. Hence, when the determination is made that there is the tendency of rollover of the vehicle, the yaw moment which is a threshold value through which VDC is intervened at the time of the vehicular understeer tendency may be set to be small as compared with the case when no determination of the tendency of rollover of the vehicle is mode. In this case, the suppression performance of the rollover can be improved by suppressing the increase in cornering force Cf (lateral acceleration Yg).

Liquid pressure unit 4 is installed to enable the provision of the braking force for at least one or each of the plurality of road wheels FL, FR, RL, RR. Brake control section 200 in the second embodiment actuates liquid pressure unit 4 to provide the braking forces for the turning outer wheels to make yaw rate γ (resultant acceleration G) small when control unit 1 determines that there is the tendency of rollover of the vehicle. Therefore, the tendency of rollover of the vehicle can be suppressed by positioning resultant acceleration G within, for example, stable region α. It should be noted that, apart from (or together with) making resultant acceleration G small when the braking force is provided for one of the turning outer wheels as described above, brake control section 200 may control the braking force such that the change rate (dG/dt) of resultant acceleration G becomes small. For example, limitation may be placed on the change rate of yaw rate γ. In this case, the promotion of the tendency of rollover of the vehicle due to the abrupt variation in resultant acceleration G may be suppressed. The other action and effects are the same as those in the case of first embodiment.

(Third Embodiment)

In the control apparatus for the vehicle in a third preferred embodiment according to the present invention, when the determination of the tendency of rollover of the vehicle is made, as the resultant acceleration information, resultant jerk dG/dt is utilized which is the change rate of resultant acceleration G with respect to time. This is a difference point from the first embodiment. Since the other structures are the same as those described in the first embodiment, the description thereof will, herein, be omitted.

Resultant acceleration information calculating section 101c in the third embodiment includes resultant acceleration calculating section 100c1 and a resultant jerk calculating section 100c2. In addition, control unit 1 in the third embodiment is provided with a resultant jerk normal direction resolving section 110 in addition to the respective sections described in the first embodiment. Resultant jerk calculating section 100c2 calculates the resultant jerk dG/dt which is the change rate of resultant acceleration G with respect to time. Specifically, resultant jerk dG/dt is calculated by deriving the change rate of resultant acceleration G calculated by resultant acceleration calculating section 100c1 with respect to time. After deriving the change rates dXg/dt, dYg/dt of two direction accelerations Xg, Yg, respectively, resultant jerk dG/dt may be calculated by synthesizing these change rates of accelerations Xg, Yg. Resultant jerk normal direction resolving section 110 performs a resolution of vector for calculated resultant jerk dG/dt and extracts a component dYg'/dt of rollover boundary line L in the normal direction as a jerk component which causes the tendency of rollover of the vehicle.

Figure 9:
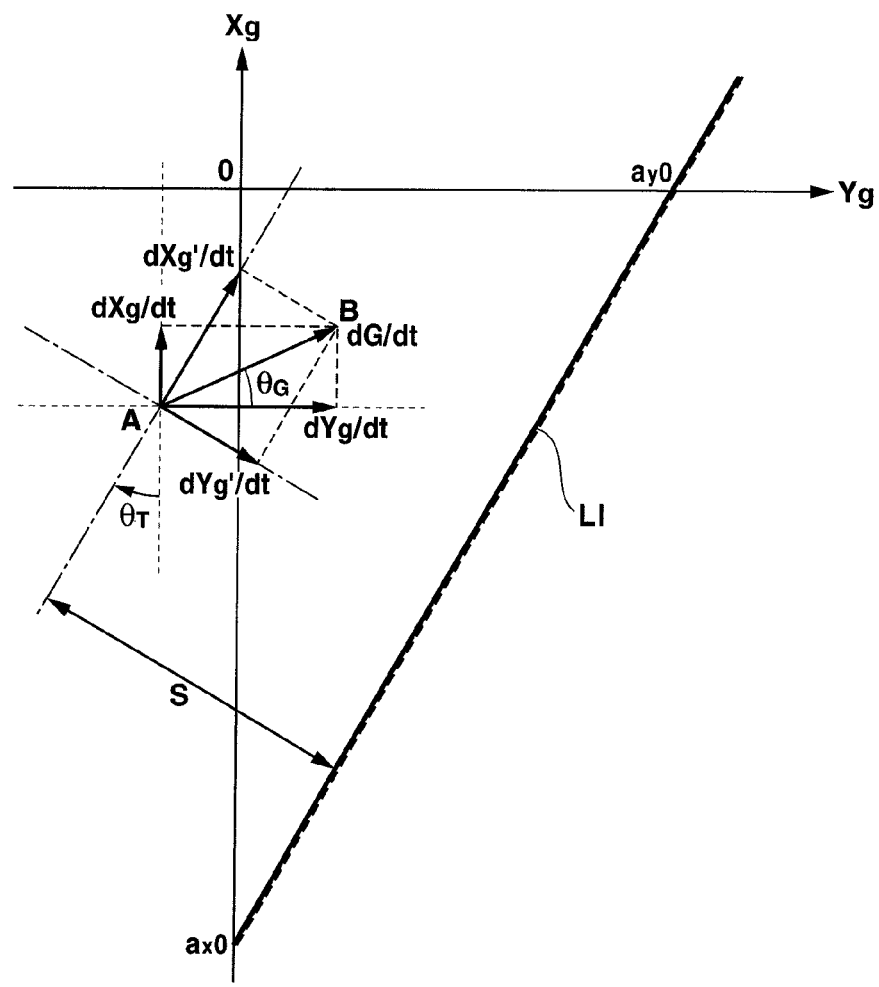
FIG. 9 is a coordinate system view with the longitudinal axis taken as the longitudinal acceleration and with the lateral axis taken as the lateral acceleration and representing a method for extracting a normal direction component of a resultant jerk.

FIG. 9 shows a conceptual diagram representing a method for extracting component dYg'/dt in the normal to direction of resultant jerk dG/dt in the coordinate system which is the same as FIG. 3. As shown in FIG. 9, in a case where resultant acceleration G is changed from a point A to a point B, the following equation (9) can represent a vector component dYg'/dt in the normal direction of boundary line L. In equation (9), dYg/dt denotes a lateral jerk and dXg/dt denotes a longitudinal jerk, and $\theta_T$ denotes an angle formed by boundary line L and the axis (the longitudinal axis) of longitudinal acceleration Xg in a case where rollover boundary line L is defined as the straight line.

$$dYg'/dt = dYg/dt \cos\theta_T + dXg/dt \sin\theta_T \quad \text{(Equation 9)}$$

That is to say, in order to have a certain resultant acceleration G (Xg, Yg) reached from point A in FIG. 9 onto boundary line L at a fastest timing, it is desirable to make certain resultant acceleration G approach to boundary line L in a vertical direction (normal direction of boundary line L) with respect to boundary line L. Thus, a Cartesian coordinate system of Xg and Yg is transformed into a coordinate system having a longitudinal axis which is parallel to boundary line L and a lateral axis which is the normal direction of boundary line L to extract a normal direction component dYg'/dt from a change quantity (transient component) of resultant acceleration G (vehicular motion). Thus, a component which would make the vehicular motion unstable, specifically, a component (a rollover transient component) which has a highest risk of rollover of the vehicle is extracted. That is to say, by extracting component dYg'/dt in the direction (normal direction) in which margin S to rollover region β is minimum from resultant jerk dG/dt, a component which has high risk of rollover of the vehicle and is predicted to make the vehicular motion unstable is taken out quantitatively as a rollover transient component. It should be noted that, even in a case where boundary line is not the straight line, a point on boundary line L which minimizes margin S to boundary line L is calculable at any time. Hence, the coordinate transformation is possible according to a point on boundary line L at which margin S is minimum and point A.

Rollover tendency determining section 100e determines the tendency of rollover of the vehicle on a basis of the magnitude of calculated resultant jerk dG/dt. Specifically, rollover tendency determining section 100e (control unit 1) determines whether the magnitude (a normal direction component quantity) of normal direction component dYg'/dt of resultant jerk dG/dt is equal to or larger than a preset threshold value (a risk determination threshold value) TH for a rollover risk determination and determines the tendency of rollover of the vehicle when normal direction component quantity dYg'/dt is equal to or larger than threshold value TH. In other words, when rollover transient component dYg'/dt is calculated on a basis of resultant jerk dG/dt representing the vehicular motion and the calculated motion (the magnitude of rollover transient component dYg'/dt) is equal to or larger than the preset predetermined motion (threshold value TH), the determination of the tendency of rollover of the vehicle is made. In this way, threshold value TH is a boundary line to determine a height of the risk of rollover. Since resultant acceleration G is easily and speedily transferred into rollover region β when the magnitude of normal directional component dYg'/dt is equal to or larger than threshold value TH, it can be predicted that there is the tendency of rollover of the vehicle. Rollover tendency region δ in the third embodiment is a region in which the magnitude of normal direction component dYg'/dt becomes equal to or larger than threshold value TH.

As expressed in equation (9), normal direction component dYg'/dt is obtained by a comparison between calculated resultant jerk dG/dt and (the direction of) rollover boundary line L. In addition, threshold value TH is an index to judge whether a possibility for resultant acceleration G to pass rollover boundary line L is equal to or higher than a predetermined value. In this way, rollover tendency determining section 100e determines the tendency of rollover of the vehicle on a basis of the relationship between resultant jerk dG/dt and rollover boundary line L. It should be noted that the possibility that resultant acceleration G is transferred into rollover region β passing rollover boundary line L can be determined on a basis of not only the magnitude of the change rate (change quantity) of resultant acceleration G (the magnitude of normal direction component dYg'/dt of resultant jerk dG/dt) but also the magnitude of change quantity of distance (margin S) from resultant acceleration G to rollover boundary line L. Hence, when a change rate of margin S is calculated according to equation (7) described above and the calculated change rate of margin S is equal to or larger than a preset threshold value, the tendency of rollover of the vehicle may be determined.

Figure 10:
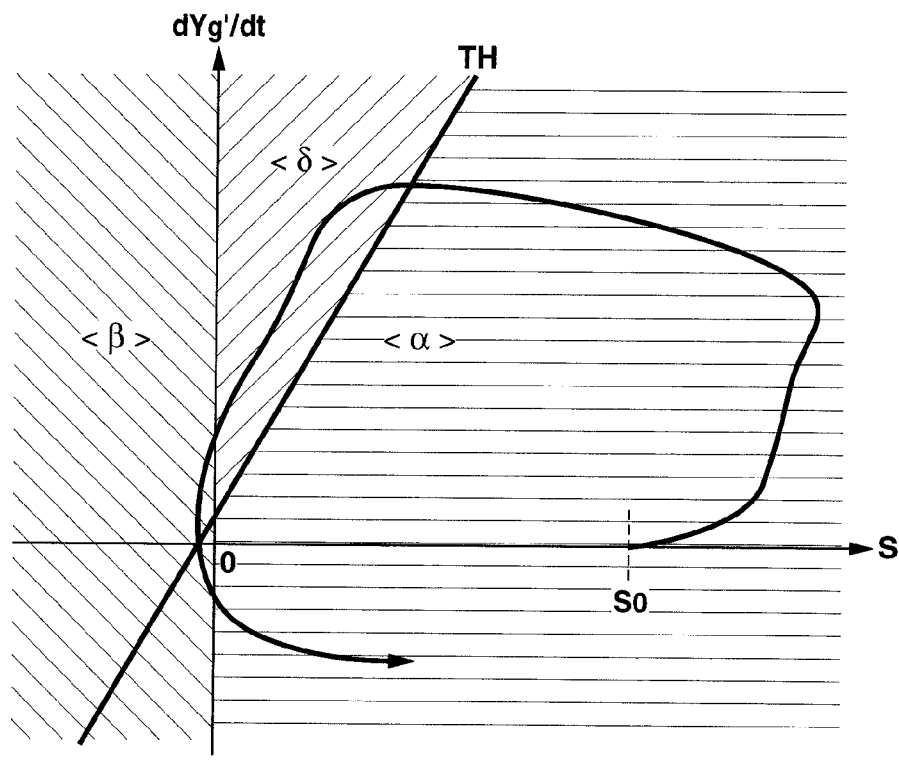
FIG. 10 is a coordinate system view with the lateral axis taken as a margin to a rollover boundary line and with the longitudinal axis taken as a normal direction component of a resultant jerk.

In addition, if, as parameters to determine the tendency of rollover of the vehicle, both of magnitude of normal direction component dYg'/dt of resultant jerk dG/dt and the distance (margin S) by which resultant acceleration G moves and reaches to rollover boundary line L are used together, the tendency of rollover of the vehicle can be determined with a higher accuracy. For example, when normal direction component (quantity, viz., magnitude) dYg'/dt is equal to or larger than preset threshold value TH and margin S (by which resultant acceleration moves and reaches to the rollover boundary line) to rollover boundary line L is smaller than a preset threshold value, the determination that there is the tendency of rollover of the vehicle may be made. Threshold value TH described above may be varied in accordance with margin S. Specifically, in a case where margin S is large, threshold value TH is preset to a larger value and in a case where margin S is small, threshold value TH is preset to a smaller value. FIG. 10 shows the coordinate system in which the lateral axis is taken as margin S to rollover boundary line L and the longitudinal axis is taken as normal direction component dYg'/dt and draws a locus of an operating point in the above defined coordinate system along with a passage of time. In this locus, as shown in FIG. 10, margin S is started from preset distance $S_0$ in a static state in which both of Xg and Yg are zero and is varied in accordance with the variations in Xg and Yg. In addition, the value of normal direction component dYg'/dt is also varied in accordance with the changes in Xg and Yg. Threshold value TH of normal direction component dYg'/dt is drawn as the straight line which is increased and decreased in accordance with (in proportion to) the increase and decrease in margin S. Threshold value TH in FIG. 10 is freely modifiable utilizing a table or so forth which accords with a characteristic of the vehicle (not only in the form of straight line). A region in which margin S is smaller than zero is rollover region β, as shown in FIG. 10. In a non-rollover region in which margin S is equal to or larger than zero, the non-rollover region can be divided into two regions, namely, a region in which the magnitude of normal direction component dYg'/dt is smaller than threshold value TH being stable region α and another region in which in which the magnitude of normal direction component dYg'/dt is equal to or larger than threshold value TH being rollover region δ.

Figure 11:
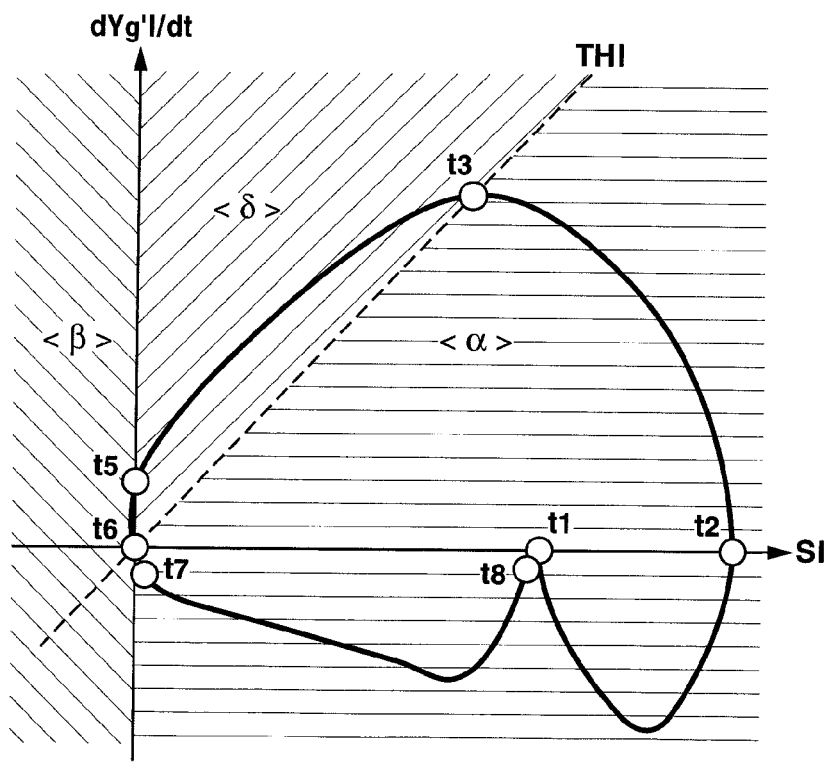
FIG. 11 is a coordinate system view with the lateral axis taken as the margin to the rollover boundary line and with the longitudinal axis taken as the normal direction component of the resultant jerk and representing the locus of the operation example shown in FIG. 6 in the coordinate system.

The rollover tendency determination using threshold value TH set so as to be varied in accordance with margin S as described above will be described below with reference to FIG. 11 and FIG. 7C. FIG. 11 shows the coordinate system in the same way as FIG. 10 and draws the locus of the operating point in FIG. 6. FIG. 7C shows the time variations of longitudinal jerk dXg/dt of operating point in FIG. 6 and lateral jerk dYg/dt thereof, normal direction component dYg'/dt of resultant jerk dG/dt with respect to left rollover boundary line Ll, and threshold value THl with respect to left rollover boundary line Ll. Respective time points of t1 through t8 shown in FIG. 11 and FIG. 7C correspond to time points t1 through t8 shown in FIG. 6, respectively. Threshold value THl in FIG. 7C is increased or decreased in accordance with the increase or decrease in margin S in FIG. 7B. Since, at a time before time point t3, normal direction component (rollover transient component) dYg'l/dt is smaller than threshold value THl, resultant acceleration G is within stable region α. Since, after time point t3, margin S is equal to or larger than zero up to time point t5 and rollover transient component dYg'l/dt becomes equal to or larger than threshold value THl, resultant acceleration G is within rollover tendency region δ. During a time duration from time point t5 to time point t6, margin S is smaller than zero. Hence, resultant acceleration G is within rollover region β. Since, after time point t6, margin S is equal to or larger than zero and the magnitude of rollover transient component dYg'/dt is again smaller than threshold value THl, resultant acceleration G falls within stable region α. As described above, not only during the time duration from time point t5 to time point t6 during which resultant acceleration α falls within rollover region β but also during the time duration from time point t3 to time point t5 during which rollover transient component dYg'l/dt becomes large and is equal to or larger than threshold value THl (resultant acceleration G falls within rollover tendency region δ), the determination that the vehicle has the tendency of rollover is made.

That is to say, the control apparatus for the vehicle in the third embodiment according to the present invention calculates resultant jerk dG/dt on a basis of resultant acceleration G as the resultant acceleration information at resultant acceleration information calculating section 100c (resultant jerk calculating section 100c1) and determines the tendency of rollover of the vehicle on a basis of the magnitude of resultant acceleration information (resultant jerk dG/dt). Therefore, the determination accuracy can be improved. That is to say, although the vehicular steady-state motion can be estimated by the use of resultant acceleration G as the resultant acceleration information as in the case of the first embodiment, in the case of third embodiment, resultant jerk dG/dt is utilized which represents the vehicular transient motion (specifically, determines a roll rate and a pitch rate which are speeds of the vehicular rolling motion and the vehicular pitching motion, respectively). Thus, the determination accuracy of the tendency of rollover of the vehicle can be increased. Specifically, when the vehicular motion (the magnitude of rollover transient component dYg'/dt) on a basis of resultant acceleration G and resultant jerk dG/dt is calculated and the calculated motion is equal to or larger than the preset vehicular motion (threshold value TH), the determination of the tendency of rollover of the vehicle is made. In this way, the tendency of rollover of the vehicle is determined depending upon whether the vehicular transient motion is equal to or larger than the predetermined value (threshold value TH). Consequently, the structure of the apparatus can be simplified.

The vehicular control apparatus in the third embodiment according to the present invention determines the tendency of rollover of the vehicle by comparing resultant acceleration G and resultant jerk dG/dt with rollover boundary line L. Specifically, a possibility for resultant acceleration G to be transferred into rollover boundary region β passing rollover boundary line L is determined on a basis of a speed of resultant acceleration G directed toward rollover boundary line L (the magnitude of normal direction component dYg'/dt of resultant jerk dG/dt) or on a basis of a speed at which distance (margin S) from resultant acceleration G to rollover boundary line L becomes shorter. In this way, the determination accuracy of the tendency of rollover of the vehicle can be increased according to the consideration paid to the transient vehicular motion (the time variation of resultant acceleration G). Specifically, resultant jerk dG/dt is resolved into the normal direction component to rollover boundary line L and the tendency of rollover of the vehicle is determined on a basis of the relationship between normal direction component dYg'/dt and rollover boundary line L. In the way as described above, the determination accuracy of the tendency of rollover of the vehicle can be improved by extracting the component (rollover transient component dYg'/dt) which has the highest risk of rollover of the vehicle and by determining the tendency of rollover of the vehicle on a basis of this extracted component. In addition, in a case where the normal direction component quantity (the magnitude of dYg'/dt) is equal to or larger than preset threshold value TH, the determination the tendency of rollover of the vehicle is made. Thus, the structure of risk determination can be simplified. It should be noted that, if the determination that there is the tendency of rollover of the vehicle is made when margin S (distance) by which resultant acceleration G moves and reaches to rollover boundary line L is smaller than a preset margin (distance) (for example, $S_0$ described in the first embodiment) in addition to the fact that normal direction component quantity is equal to or larger than threshold value TH, the determination accuracy of the tendency of rollover of the vehicle can more remarkably be improved.

[Effects of the Control Apparatus for the Vehicle in the Third Embodiment]

(1) Control unit 1 is provided with resultant acceleration calculating section 100c1 configured to calculate resultant acceleration G which is the synthesis of two direction accelerations (Xg, Yg) acted upon the vehicle; resultant jerk calculating section 100c2 configured to calculate resultant jerk dG/dt which is the synthesis of the change quantity dXg/dt, dYg/dt of the two direction accelerations Xg, Yg; and rollover tendency determining section 100e configured to determine the tendency of rollover of the vehicle using calculated resultant jerk dG/dt. Hence, the determination accuracy of the tendency of rollover of the vehicle can be improved by the use of resultant jerk dG/dt which represents the transient vehicular motion.

(2) Control unit 1 is provided with rollover boundary line setting section 100d configured to set rollover boundary line L related to the accelerations to determine the tendency of rollover of the vehicle by the comparison of the rollover boundary line with calculated resultant jerk dG/dt. Thus, the structure of the control apparatus for the vehicle can be simplified.

(3) Control unit 1 is provided with resultant jerk normal direction resolving section 110 configured to resolve calculated resultant jerk dG/dt into the normal direction component and determines the tendency of rollover of the vehicle on a basis of the relationship between normal direction component dYg'/dt and rollover boundary line L. Thus, the tendency of rollover of the vehicle is determined on a basis of the component which has the highest risk of rollover of the vehicle (normal direction component dYg'/dt). Consequently, the determination accuracy of the tendency of rollover of the vehicle can be improved.

(4) Control unit 1 determines the tendency of rollover of the vehicle in a case where normal direction component quantity (the magnitude of dYg'/dt) is equal to or larger than risk determination threshold value TH. Hence, the structure can be simplified.

(5) Control unit 1 calculates resultant jerk dG/dt on a basis of resultant acceleration G at resultant acceleration information calculating section 100c and determines the rollover tendency of the vehicle on a basis of the magnitude of calculated resultant jerk dG/dt. Hence, the same effects as above-described item (1) can be obtained.

(6) Control unit 1 is provided with rollover boundary line setting section 100d configured to set rollover boundary line L to determine the tendency of rollover of the vehicle by the comparison of rollover boundary line L with the calculated resultant acceleration information and rollover boundary line L is set on a basis of specifications of the vehicle and the line connecting points at each of which wheel loads of the turning inner wheels are zero when lateral acceleration Yg and longitudinal acceleration Xg are applied to the vehicle. Hence, while the structure of the control apparatus can be simplified, the determination accuracy of the tendency of rollover of the vehicle can be improved.

(7) Control unit 1 determines the tendency of rollover of the vehicle when distance S by which calculated resultant acceleration G moves and reaches to preset rollover boundary line L is smaller than the preset distance ($S_0$).

Hence, the determination accuracy of the tendency of rollover of the vehicle can furthermore be improved.

(8) The control apparatus for the vehicle comprises: longitudinal acceleration sensor 17 configured to detect longitudinal acceleration Xg acted upon the vehicle; lateral acceleration sensor 18 configured to calculate lateral acceleration Yg acted upon the vehicle; and control unit 1 including resultant acceleration calculating section 100c1 configured to calculate resultant acceleration G on a basis of detected longitudinal acceleration Xg and lateral acceleration Yg, resultant jerk calculating section 100c2 configured to calculate resultant jerk dG/dt which is the change rate of calculated resultant acceleration G with respect to time, wherein control unit 1 calculates the vehicular motion on a basis of calculated resultant acceleration G and resultant jerk dG/dt and determines the tendency of rollover of the vehicle when the calculated vehicular motion is larger than the preset predetermined motion. Hence, while the structure can be simplified, the determination accuracy of the tendency of rollover of the vehicle can remarkably be improved.

(9) Control unit 1 is provided with rollover boundary line setting section 100d configured to set rollover boundary line L related to the accelerations to determine the preset predetermined motion on a basis of specifications of the vehicle and determines the tendency of rollover of the vehicle by the comparison of calculated resultant acceleration G and resultant jerk dG/dt with rollover boundary line L. Hence, while the structure can be simplified, the determination accuracy of the tendency of rollover of the vehicle can more remarkably be improved.

(10) Control unit 1 is provided with resultant jerk normal direction resolving section 110 configured to resolve calculated resultant jerk dG/dt into normal direction component to rollover boundary line L and rollover tendency determining section 100e configured to determine the tendency of rollover of the vehicle when normal direction component quantity (the magnitude of dYg'/dt) is equal to or larger than risk determination threshold value TH and distance S by which calculated resultant acceleration G moves and reaches to set rollover boundary line L is smaller than preset distance ($S_0$). Therefore, while the structure can be simplified, the determination accuracy of the tendency of rollover of the vehicle can more remarkably be improved.

(Fourth Embodiment)

Figure 12:
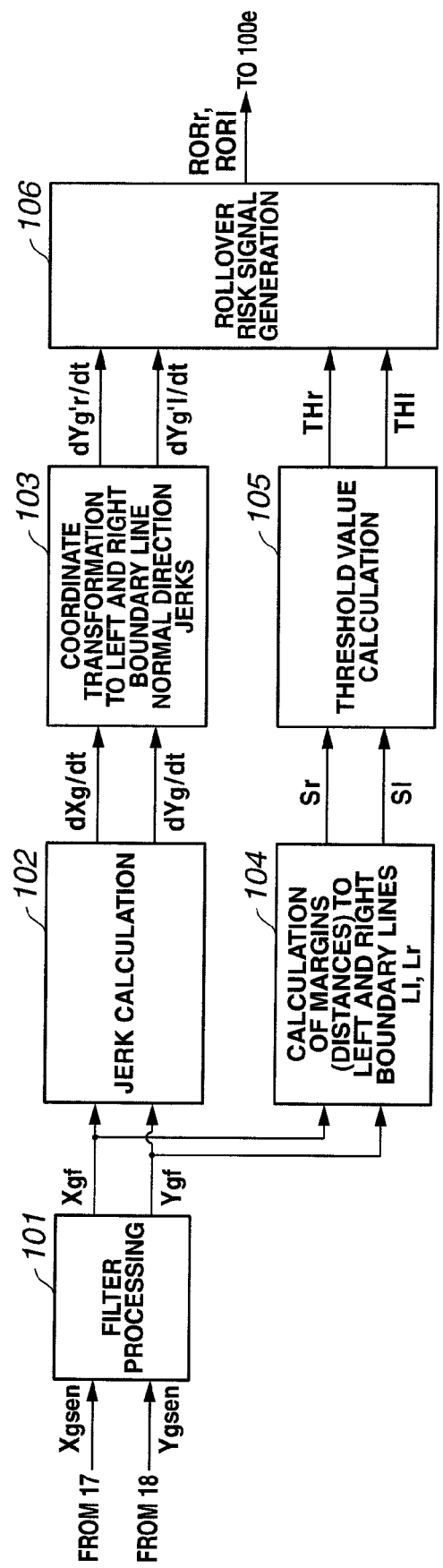
FIG. 12 is a calculation block diagram of a rollover tendency integrated value (a risk of rollover).

The control apparatus for the vehicle in a fourth preferred embodiment according to the present invention utilizes an integrated value of a deviation between threshold value TH and normal direction component $dYg'/dt$ when determining the tendency of rollover of the vehicle. This is a difference point from the control apparatus for the vehicle in the third embodiment. The other structures are generally the same as those of the third embodiment and, hence, the description thereof will, herein, be omitted. Control unit 1 in the fourth embodiment includes a rollover tendency integrated value calculating section 106 (refer to FIG. 12). FIG. 12 shows a calculation block diagram of vehicular motion determining section 100 including rollover tendency integrated value calculating section 106 in the case of the fourth embodiment. That is to say, vehicular motion determining section 100 in the fourth embodiment includes: a filter processing section 101; a jerk calculating section 102; a normal direction component calculating section 103; a margin calculating section 104; a threshold value calculating section 105; and rollover tendency integrated value calculating section 106. It should, herein, be noted that filter processing section 101 in FIG. 12 generally corresponds to longitudinal and lateral acceleration calculating sections 100a, 100b in FIG. 1B, jerk calculating section 102 in FIG. 12 generally corresponds to resultant jerk calculating section 100c2 in FIG. 1B, normal direction component calculating section 103 generally corresponds to resultant jerk normal direction component resolving section 110 in FIG. 1B, and margin calculating section 104 and threshold valve calculating section 105 generally correspond to rollover boundary line setting section 100d in FIG. 1B.

Filter processing section 101 receives the inputs of longitudinal acceleration (sensor value) $Xg_{sen}$ detected by vehicular motion sensor unit 10 and lateral acceleration (sensor value) $Yg_{sen}$ detected thereby and performs a low pass filter calculation in order to eliminate disturbance components of the longitudinal and lateral accelerations due to road surface noises and so forth from the sensor values. A filter cut-off frequency of this filter processing section may be set to a frequency (approximately 2 through 5 Hz) higher than a responsive frequency to the vehicular rolling and pitching motions and can extract acceleration components of the vehicular motion. Filter processing section 101 outputs a filtered longitudinal acceleration Xgf and a filtered lateral acceleration Ygf which are longitudinal acceleration Xg and lateral acceleration Yg after the filter processing to jerk calculating section 102 and margin calculating section 104. Jerk calculating section 102 performs time differentiations for filtered longitudinal acceleration Xgf and filtered lateral acceleration Ygf, respectively. Specifically, jerk calculating section 102 calculates change quantities of respectively filtered longitudinal acceleration and lateral acceleration Xgf, Ygf from time differences of inputted filtered longitudinal acceleration and lateral accelerations Xgf, Ygf (the difference between the previous value thereof and the present value thereof) and outputs calculated longitudinal jerk $dXg/dt$ and calculated lateral jerk $dYg/dt$ to normal direction component calculating section 103.

Normal direction component calculating section 103 corresponds to resultant jerk normal direction resolving section 110 in the third embodiment, as described above. Normal direction component calculating section 103 performs the vector resolution for resultant jerk $dG/dt$ between longitudinal jerk $dXg/dt$ and lateral jerk $dYg/dt$ to a direction (normal direction) in which margins Sl, Sr from resultant acceleration G at the present time point to left and right rollover boundary lines Ll, Lr with respect to left and right rollover boundary lines Ll, Lr (for example, to the deceleration side in which Xg indicates negative) are minimized and performs the coordinate transformation (refer to FIG. 9). The normal direction components $dYg'l/dt$, $dYg'r/dt$ of the resultant jerk to each of left and right rollover boundary lines Ll, Lr are derived on a basis of equation (9) described above in a case where left and right boundary lines of Ll, Lr can be defined as the straight lines. Thus, normal direction components $dYg'l/dt$, $dYg'r/dt$ (hereinafter, referred to as left and right rollover risk jerks) of resultant jerk $dG/dt$ with respect to left and right rollover boundary lines Ll, Lr are extracted and outputted from normal direction component calculating section 103 to rollover tendency integrated value calculating section 106.

Margin calculating section 104 calculates margins Sl, Sr from resultant acceleration G at the present time point to left and right rollover boundary lines Ll, Lr (the distances are minimum), respectively, and outputs the calculated margins Sl, Sr to threshold value calculating section 105. Margins Sl, Sr are based on equation (7) in a case where boundary lines Ll, Lr can be defined as the straight lines. Threshold value calculating section 105 prepares threshold values THl, THr to determine the tendency of rollover of the vehicle (rollover risk) using rollover risk jerks $dYg'l/dt$, $dYg'r/dt$ in accordance with margins Sl, Sr (for example, in the form of straight line TH shown in FIG. 10), respectively. For example, threshold values THl, THr may be prepared using a table with margins Sl, Sr inputted. These threshold values THl, THr are outputted to rollover tendency integrated value calculating section 106.

Figure 13B:
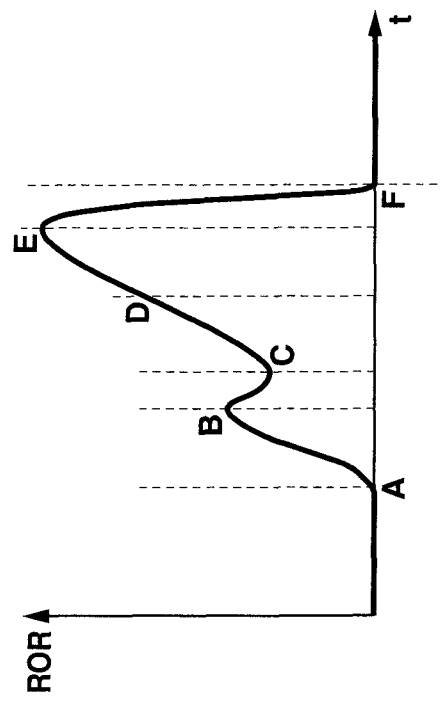
FIGS. 13A and 13B are graphs representing time variations in the risk of rollover.
Figure 13A:
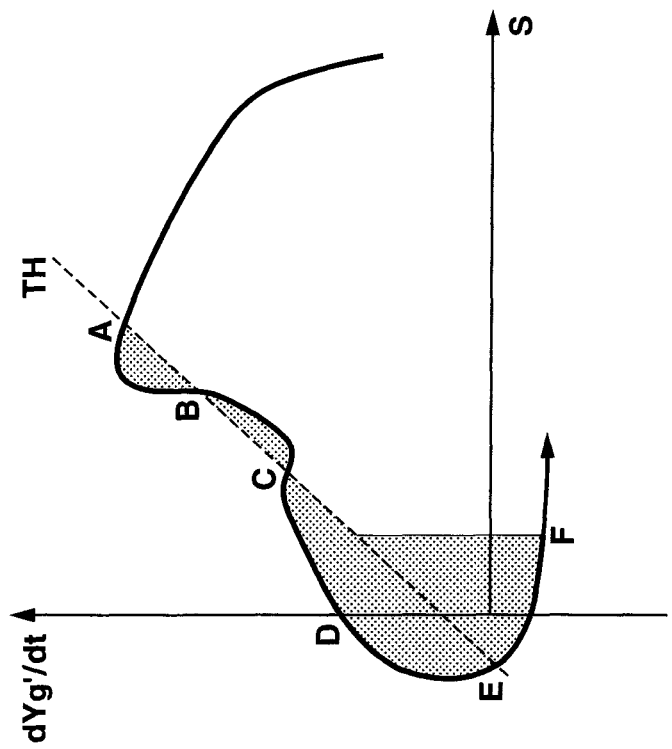

Rollover tendency integrated value calculating section 106 integrates the deviation between inputted rollover risk jerks $dYg'l/dt$, $dYg'r/dt$ and threshold values THl, THr. This integration processing is carried out, for example, in response to the determination of whether rollover risk jerk $dYg'/dt$ is equal to or larger than threshold value TH, is started when rollover risk jerks $dYg'l/dt$, $dYg'r/dt$ are equal to or larger than respectively corresponding threshold values THl, THr and is carried out until the integrated value again returns to zero. This integrated value is used as a rollover tendency index (a rollover risk ROR) representing a degree of risk of the vehicular rollover. FIGS. 13A and 13B show characteristic graphs representing the time variation of rollover risk ROR. FIG. 13A shows a new locus in the same coordinate system as FIG. 10. After a point A in FIG. 13A at which normal direction component quantity $dYg'/dt$ is first equal to or larger than threshold value TH, the deviation between $dYg'/dt$ and TH is integrated. FIG. 13B shows a time variation in rollover risk ROR which is the integrated value for the deviation. During the time duration from point A to point B in FIG. 13A and the time duration from point C to point E in FIG. 13A, the deviation indicates positive and ROR is increased. During the time duration from point B to point C in FIG. 13A, the above-described deviation indicates negative and ROR is decreased and, during the time duration from point E to point F in FIG. 13A, the above-described deviation becomes negative and ROR is decreased. ROR is returned to zero at point F in FIG. 13A. In the way described above, rollover tendency integrated value calculating section 106 calculates left and right rollover risks RORl, RORr on a basis of normal direction component $dYg'/dt$ ($dYg'l/dt$, $dYg'r/dt$) and threshold value TH (THl, THr) and outputs prepared rollover risk signals (RORl, RORr) to rollover tendency determining section 100e.

Rollover tendency determining section 100e, in this embodiment, determines the tendency of rollover of the vehicle in a case where rollover risk ROR is equal to or larger than a preset predetermined value $ROR_0$. That is to say, the fact that the magnitude of rollover risk ROR is equal to or larger than predetermined value $ROR_0$ represents that a time duration during which resultant acceleration G is held to fall within rollover tendency region δ (refer to FIGS. 10 and 11) is long. In this case, it can be predicted that there is the tendency of rollover of the vehicle. In other words, rollover tendency determining section 100e calculates rollover risk ROR representing the vehicular motion on a basis of resultant jerk dG/dt and determines the tendency of rollover of the vehicle when the calculated magnitude of vehicular motion (rollover risk) is equal to or larger than preset predetermined motion (threshold value $ROR_0$).

The determination of the tendency of rollover of the vehicle utilizing rollover risk ROR will be described below with reference to FIGS. 7C and 7D. FIG. 7D shows a time variation in left rollover risk ROR1 with respect to left rollover boundary line L1. It should be noted that each of time points t1 through t8 in FIG. 7D correspond to respective time points t1 through t8 shown in FIG. 6. Since, at a time duration before time point t3, rollover risk jerk dYg'l/dt is smaller than threshold value THl (rollover risk boundary line) as shown in FIG. 7C, rollover risk ROR1 is not calculated and indicates zero. Hence, resultant acceleration G is within stable region α. At time point t3, rollover risk jerk dYg'l/dt is equal to or larger than threshold value THl. Hence, the calculation of rollover risk ROR1 is started. During a time duration from time point t3 to a time point t11 (refer to FIG. 7D), rollover risk ROR1 is below predetermined value $ROR_0$. Hence, resultant acceleration G is within stable region α. During the time duration from time point t11 to a time point t12, rollover risk ROR becomes equal to or larger than predetermined value $ROR_0$. Hence, resultant acceleration G is within rollover tendency region δ. During the time duration from time point t12 to time point t7, rollover risk ROR1 is smaller than predetermined value $ROR_0$. Hence, resultant acceleration G is within stable region α. Since, at time point t7, rollover risk ROR1 is zero, the calculation of rollover risk ROR1 is ended. As described above, during the time duration from time point t11 to point t12 in which rollover risk ROR1 becomes equal to or larger than predetermined value $ROR_0$ (resultant acceleration G is within rollover tendency region δ), the determination that the vehicle has the tendency of rollover of the vehicle is made.

The control apparatus for the vehicle in the fourth embodiment according to the present invention utilizes integrated value ROR of the deviation between threshold value TH of rollover transient component (rollover risk jerk) dYg'/dt and rollover transient component dYg'/dt. That is to say, since an integration processing has a filtering action for eliminating influence of noises, the utilization of integrated value ROR as a parameter (a rollover risk signal) permits the suppression of influence of noises developed on calculated longitudinal and lateral jerks dXg/dt, dYg/dt due to the road surface disturbances. Hence, the determination accuracy can more remarkably be improved. Specifically, the determination that the vehicle has the tendency of rollover of the vehicle when integrated value ROR is equal to or larger than predetermined value $ROR_0$. In this way, the use of threshold value $ROR_0$ permits the structure for the risk determination can be simplified. It should be noted that, in the same way as described in the third embodiment, the tendency of rollover of the vehicle is determined when the distance (margin S) by which resultant acceleration G moves and reaches to rollover boundary line L is smaller than preset distance ($S_0$), in addition to the determination that integrated value ROR is equal to or larger than predetermined value $ROR_0$. Thus, the determination accuracy of the tendency of rollover of the vehicle can more remarkably be improved.

[Effects of the Control Apparatus for the Vehicle in the Fourth Embodiment]

(1) Control unit 1 is provided with rollover tendency integrated value calculating section 106 configured to integrate the deviation between normal direction component quantity (rollover risk jerk) dYg'/dt and preset risk determination threshold value TH and control unit 1 determines that the vehicle has the tendency of rollover of the vehicle in a case where the integrated value (rollover risk) ROR is equal to or longer than the preset predetermined value $ROR_0$. Thus, while the structure can be simplified, the determination accuracy of the tendency of rollover of the vehicle can remarkably be improved (Other Embodiments)

As described hereinabove, the present invention has been described with reference to first through fourth embodiments. However, the specific structure of the present invention is not limited to these embodiments. Various design modifications are included in the present invention without departing from the scope of the present invention.

The invention which can be grasped from each or any one of the above-described first through fourth embodiments is listed as will be described below.

(A1) A control apparatus for a vehicle, comprising a control unit including: a resultant acceleration calculating section configured to calculate a resultant acceleration which is a synthesis of two direction accelerations acted upon the vehicle; a resultant jerk calculating section configured to calculate a resultant jerk which is a synthesis of change quantities of the two direction accelerations (with respect to time) or which is the change quantity of the resultant acceleration (with respect to time); and a rollover tendency determining section configured to determine the tendency of rollover of the vehicle using the calculated resultant acceleration (G) or calculated resultant jerk (dG/dt).

(A2) The control apparatus for the vehicle as set forth in item (A1), wherein the control unit is provided with a rollover boundary line setting section configured to set a rollover boundary line related to the accelerations to determine the tendency of rollover of the vehicle by the comparison of the rollover boundary line with the calculated resultant acceleration or resultant jerk, the rollover boundary line being set on a basis of specifications of the vehicle.

(A3) The control apparatus for the vehicle as set forth in item (A2), wherein the rollover boundary line is a line connecting points at each of which wheel loads of turning inner wheels when the longitudinal and lateral accelerations are applied to the vehicle are zero.

(A4) The control apparatus for the vehicle as set forth in item (A3), wherein the control unit determines that there is the tendency of rollover of the vehicle when a distance by which the calculated resultant acceleration moves and reaches to the rollover boundary line is smaller than a preset distance ($S_0$).

(A5) The control apparatus for the vehicle as set forth in item (A3), wherein the control unit is provided with the resultant jerk normal direction resolving section configured to resolve the calculated resultant jerk into the normal direction component to the rollover boundary line and the tendency of rollover of the vehicle is determined on a basis of the relationship between the normal direction component and the rollover boundary line.

(A6) The control apparatus for the vehicle as set forth in item (A5), wherein the control unit determines the tendency of rollover of the vehicle in a case where the quantity of the normal direction component is equal to or larger than the preset risk determination threshold value.

(A7) The control apparatus for the vehicle as set forth in item (A5), wherein the control unit is provided with the rollover tendency integrated value calculating section configured to integrate the deviation between the normal line component quantity and preset risk determination threshold value and determines the tendency of rollover of the vehicle when the integrated value is equal to or larger than the preset predetermined value.

(A8) The control apparatus for the vehicle as set forth in item (A1), wherein the vehicle is provided with the brake actuator which is capable of providing the braking force for at least one or each of a plurality of road wheels installed on the vehicle and the control unit is provided with the brake control section configured to actuate the brake actuator when the rollover tendency determining section determines that there is the tendency of rollover of the vehicle.

(A9) The control apparatus for the vehicle as set forth in item (A8), wherein the brake control section provides the braking force for at least one or each of the respective road wheels such that the resultant acceleration or the resultant jerk becomes small (becomes smaller than the predetermined resultant acceleration or the predetermined resultant jerk).

(B1) A control apparatus for a vehicle, comprising a control unit including: an acceleration calculating section configured to calculate two direction accelerations acted upon the vehicle; a resultant acceleration information calculating section configured to calculate a resultant acceleration information related to a resultant acceleration which is a synthesis of the calculated respective accelerations; and a rollover tendency determining section configured to determine the tendency of rollover of the vehicle on a basis of a magnitude of the calculated resultant acceleration information and the control unit actuates the brake actuator which provides a braking force for at least one or each of road wheels installed on the vehicle in a case where the rollover tendency determining section determines the tendency of rollover of the vehicle.

(B2) The control apparatus for the vehicle as set forth in item (B1), wherein the control unit calculates a resultant jerk on a basis of the resultant acceleration at the resultant acceleration information calculating section (100c) and determines the tendency of rollover of the vehicle on a basis of the magnitude of the calculated resultant jerk.

(B3) The control apparatus for the vehicle as set forth in item (B1), wherein the acceleration calculating section includes: the longitudinal acceleration calculating section configured to calculate the longitudinal acceleration of the vehicle; and the lateral acceleration calculating section configured to calculate the lateral acceleration of the vehicle and the control unit calculates, at the resultant acceleration information calculating section, the resultant acceleration on a basis of the calculated longitudinal acceleration and the calculated lateral acceleration.

(B4) The control apparatus for the vehicle as set forth in item (B1), wherein the acceleration calculating section comprises the rollover boundary line setting section configured to set the rollover boundary line to determine the tendency of rollover of the vehicle by the comparison of the rollover boundary line with the calculated resultant acceleration information and the rollover boundary line is set on a basis of specifications of the vehicle and is a line connecting points at each of which wheel loads of turning inner wheels are zero when the lateral acceleration and longitudinal acceleration are applied to the vehicle.

(B5) The control apparatus for the vehicle as set forth in item (B4), wherein the control unit is provided with the resultant jerk calculating section configured to calculate the resultant jerk on a basis of the resultant acceleration and the resultant jerk normal direction resolving section configured to resolve the calculated resultant jerk into the normal direction component to the rollover boundary line and determines the tendency of rollover of the vehicle on a basis of the relationship between the normal direction component and the rollover boundary line.

(B6) The control apparatus for the vehicle as set forth in item (B5), wherein the control unit determines whether the quantity of the normal direction component is equal to or larger than the risk determination threshold value, is provided with the rollover tendency integrated value calculating section configured to integrate the deviation between the normal direction component quantity and the risk determination threshold value, and determines the tendency of rollover of the vehicle in a case where the integrated value is equal to or larger than the preset predetermined value ($ROR_0$).

(B7) The control apparatus for the vehicle as set forth in item (B6), wherein the control unit determines the tendency of rollover of the vehicle when the distance (S) by which the calculated resultant acceleration (G) moves and reaches to the rollover boundary line (L) is smaller than the preset distance ($S_0$).

(C1) A control apparatus for a vehicle, comprising: the longitudinal acceleration sensor configured to detect the longitudinal acceleration acted upon the vehicle; the lateral acceleration sensor configured to detect the lateral acceleration acted upon the vehicle; the resultant acceleration calculating section configured to calculate the resultant acceleration (G) on a basis of the detected longitudinal acceleration and the detected lateral acceleration; and the resultant jerk calculating section configured to calculate the resultant jerk which is the change rate of the resultant acceleration with respect to time; and the control unit configured to calculate the vehicular motion on a basis of the calculated resultant acceleration and the resultant jerk and to determine the tendency of rollover of the vehicle when the calculated motion is equal to or larger than the preset predetermined motion.

(C2) The control apparatus for the vehicle as set forth in item (C1), wherein the control unit includes the rollover boundary line setting section configured to set the rollover boundary line related to the accelerations to determine the preset predetermined motion on a basis of specifications of the vehicle and determines the tendency of rollover of the vehicle according to a comparison of the calculated resultant acceleration and the resultant jerk with the rollover boundary line.

(C3) The control apparatus for the vehicle as set forth in item (C2), wherein the control unit is provided with the resultant jerk normal direction resolving section configured to resolve the calculated resultant jerk into the normal direction component to the rollover boundary line and the rollover tendency determining section configured to determine the tendency of rollover of the vehicle when the quantity of the normal direction component is equal to or larger than the preset risk determination threshold value and the distance by which the calculated resultant acceleration moves and reaches to the set rollover boundary line is smaller than the preset distance.

(C4) The control apparatus for the vehicle as set forth in item (C3), wherein the vehicle is provided with the brake actuator which is capable of providing a braking force for at least one or each of a plurality of road wheels installed on the vehicle and the control unit is provided with the brake control section configured to actuate the brake actuator when the rollover tendency determining section determines the tendency of rollover of the vehicle and the brake control section provides the braking force for at least one or each of the road wheels such that the resultant acceleration or the resultant jerk becomes smaller than a predetermined resultant acceleration or predetermined resultant jerk.

This application is based on a prior Japanese Patent Application No. 2010-261572 filed in Japan on Nov. 24, 2010. The entire contents of this Japanese Patent Application No. 2010-261572 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A control apparatus for a vehicle, comprising a control unit including:
    a resultant acceleration information calculating section configured to calculate a resultant acceleration which is a synthesis of two orthogonal direction accelerations acted upon the vehicle;
    a resultant jerk calculating section configured to calculate a resultant jerk of at least one of a change rate of the resultant acceleration with respect to time and of the synthesis of change rates of both of the two orthogonal direction accelerations with respect to time; and
    a rollover tendency determining section configured to determine a tendency of rollover of the vehicle using the calculated resultant jerk.

2. The control apparatus for the vehicle as claimed in claim 1, wherein the control unit is provided with a rollover boundary line setting section configured to set a rollover boundary line related to the accelerations, to determine the tendency of rollover of the vehicle on a basis of specifications of the vehicle, the rollover tendency determining section determining the tendency of rollover of the vehicle according to a comparison of the set rollover boundary line with the calculated resultant jerk.

3. The control apparatus for the vehicle as claimed in claim 2, wherein the control unit is provided with a resultant jerk normal direction resolving section configured to resolve the calculated resultant jerk into a normal direction component to the rollover boundary line and the control unit determines the tendency of rollover of the vehicle using the normal direction component.

4. The control apparatus for the vehicle as claimed in claim 2, wherein the control unit determines that there is the tendency of rollover of the vehicle by comparing the calculated resultant acceleration and resultant jerk with the set rollover boundary line and determines that there is the tendency of rollover of the vehicle when a distance by which the calculated resultant acceleration moves and reaches to the set rollover boundary line is smaller than a preset distance.

5. The control apparatus for the vehicle as claimed in claim 2, wherein the rollover boundary line is a line connecting points at each of which a wheel load of each turning inner road wheel becomes zero when a lateral acceleration and a longitudinal acceleration are applied to the vehicle.

6. The control apparatus for the vehicle as claimed in claim 5, wherein the control unit determines the tendency of rollover of the vehicle in a case where a quantity of the normal direction component is equal to or larger than a preset risk determination threshold value.

7. The control apparatus for the vehicle as claimed in claim 6, wherein the control unit is provided with a rollover tendency integrated value calculating section configured to integrate a deviation between the normal direction component quantity and the preset risk determination threshold value, and wherein the control unit determines the tendency of rollover of the vehicle when the integrated value is equal to or larger than a preset predetermined value.

8. The control apparatus for the vehicle as claimed in claim 1, wherein the vehicle is provided with a brake actuator which is capable of providing a braking force for at least one or each of a plurality of road wheels installed on the vehicle, and the control unit is provided with a brake control section configured to actuate the brake actuator when the rollover tendency determining section determines the tendency of rollover of the vehicle.

9. The control apparatus for the vehicle as claimed in claim 8, wherein the brake control section provides the braking force for at least one or each of the road wheels such that the resultant acceleration or the resultant jerk becomes smaller than a predetermined resultant acceleration or a predetermined resultant jerk.

10. A control apparatus for a vehicle, comprising:
    a longitudinal acceleration calculating section configured to calculate a longitudinal acceleration acted upon the vehicle;
    a lateral acceleration calculating section configured to calculate a lateral acceleration acted upon the vehicle;
    a resultant acceleration information calculating section configured to calculate a resultant acceleration information related to a resultant acceleration which is a synthesis of the calculated respective longitudinal and lateral accelerations;
    a resultant jerk calculating section configured to calculate a resultant jerk of at least one of change rates of: a change rate of the resultant acceleration with respect to time; and both the longitudinal and lateral accelerations with respect to time;
    a rollover tendency determining section configured to determine the tendency of rollover of the vehicle on a basis of only the calculated resultant jerk; and
    a control unit configured to actuate a brake actuator to provide a braking force for at least one or each of road wheels installed on the vehicle when the rollover tendency determining section determines the tendency of rollover of the vehicle.

11. The control apparatus for the vehicle as claimed in claim 10, wherein the control unit calculates a resultant acceleration on a basis of the calculated longitudinal acceleration and the calculated lateral acceleration, at the resultant acceleration information calculating section.

12. The control apparatus for the vehicle as claimed in claim 10, wherein the control unit is provided with a rollover boundary line setting section configured to set a rollover boundary line to determine the tendency of rollover of the vehicle according to a comparison of the rollover boundary line with the calculated resultant jerk, and wherein the rollover boundary line is a line connecting points at each of which wheel loads of turning inner wheels are zero when the lateral acceleration and the longitudinal accelerations are applied to the vehicle.

13. The control apparatus for the vehicle as claimed in claim 12, wherein the control unit is provided with a resultant jerk normal direction resolving section configured to resolve the calculated resultant jerk into a normal direction component to the rollover boundary line, and wherein the control unit determines the tendency of rollover of the vehicle on a basis of a relationship between the normal direction component and the rollover boundary line.

14. The control apparatus for the vehicle as claimed in claim 13, wherein the control unit determines whether a quantity of the normal direction component is equal to or larger than a preset risk determination threshold value, the control unit is provided with a rollover tendency integrated value calculating section configured to integrate a deviation between the normal direction component quantity and the risk determination threshold value, and the control unit determines the tendency of rollover of the vehicle in a case where the integrated value is equal to or larger than a preset predetermined value.

15. The control apparatus for the vehicle as claimed in claim 14, wherein the control unit determines the tendency of rollover of the vehicle when a distance by which the calculated resultant acceleration moves and reaches to the rollover boundary line is smaller than a preset distance.

16. A control apparatus for a vehicle, comprising:
- a longitudinal acceleration sensor configured to detect a longitudinal acceleration acted upon the vehicle;
- a lateral acceleration sensor configured to detect a lateral acceleration acted upon the vehicle;
- a resultant acceleration calculating section configured to detect a resultant acceleration on a basis of the detected longitudinal acceleration and lateral acceleration;
- a resultant jerk calculating section configured to calculate a change rate of the calculated resultant acceleration with respect to time to calculate a resultant jerk; and
- a control unit configured to calculate a motion of the vehicle on a basis of the calculated resultant jerk, and configured to determine a tendency of rollover of the vehicle when the calculated motion of the vehicle is larger than a predetermined motion.

17. The control apparatus for the vehicle as claimed in claim 16, wherein the control unit is provided with a rollover boundary line setting section configured to set a rollover boundary line related to the accelerations to determine the preset predetermined motion, with the rollover boundary line being set on a basis of specifications of the vehicle, and wherein the control unit determines the tendency of rollover of the vehicle according to the calculated resultant jerk and a comparison of the rollover boundary line with the calculated resultant jerk.

18. The control apparatus for the vehicle as claimed in claim 17, wherein the control unit is provided with a resultant jerk normal direction resolving section configured to resolve the calculated resultant jerk into a normal direction component to the rollover boundary line and determines the tendency of rollover of the vehicle when a quantity of the normal direction component is equal to or larger than a preset risk determination threshold value and a distance by which the calculated resultant acceleration moves and reaches to the set rollover boundary line is smaller than a preset distance.

19. The control apparatus for the vehicle as claimed in claim 18, wherein the vehicle is provided with a brake actuator which is capable of providing a braking force for at least one or each of a plurality of road wheels installed on the vehicle, and the control unit is provided with a brake control section configured to actuate the brake actuator when the tendency of rollover of the vehicle is determined by the rollover tendency determining section and the brake control section provides the braking force for at least one or each of the road wheels such that the resultant acceleration or the resultant jerk becomes smaller than a predetermined resultant acceleration or a predetermined jerk.

* * * * *